(12) United States Patent
McAnulla

(10) Patent No.: US 11,808,326 B2
(45) Date of Patent: Nov. 7, 2023

(54) INFINITELY VARIABLE MULTI-EPICYCLIC FRICTION TRANSMISSION SYSTEM FOR ELECTRIC MOTOR

(71) Applicant: Aidan McAnulla, County Cavan (IE)

(72) Inventor: Aidan McAnulla, County Cavan (IE)

( * ) Notice: Subject to any disclaimer, the term of this patent is extended or adjusted under 35 U.S.C. 154(b) by 63 days.

(21) Appl. No.: 17/833,854

(22) Filed: Jun. 6, 2022

(65) Prior Publication Data
US 2022/0299092 A1  Sep. 22, 2022

Related U.S. Application Data

(63) Continuation-in-part of application No. 17/323,160, filed on May 18, 2021, now Pat. No. 11,353,093, which is a continuation-in-part of application No. 16/560,041, filed on Sep. 4, 2019, now Pat. No. 11,009,107.

(51) Int. Cl.
*F16H 57/08* (2006.01)
*F16H 15/50* (2006.01)

(52) U.S. Cl.
CPC ......... *F16H 15/503* (2013.01); *F16H 57/082* (2013.01); *F16H 2057/085* (2013.01); *F16H 2200/0021* (2013.01)

(58) Field of Classification Search
CPC ................. F16H 15/503; F16H 57/082; F16H 2057/085; F16H 2200/0021
See application file for complete search history.

(56) References Cited

U.S. PATENT DOCUMENTS

| | | | |
|---|---|---|---|
| 2,424,873 A | 7/1947 | Abbrecht | |
| 3,224,300 A | 12/1965 | Chery | |
| 3,349,642 A | 10/1967 | Alsch | |
| 3,357,277 A | 12/1967 | Alsch | |
| 3,420,122 A | 1/1969 | Okabe | |
| 3,793,910 A | 2/1974 | Nasvytis | |
| 4,267,749 A | 5/1981 | Chambers et al. | |
| 4,293,050 A | 10/1981 | Goloff et al. | |

(Continued)

FOREIGN PATENT DOCUMENTS

| | | | | |
|---|---|---|---|---|
| CN | 101688609 A | * | 3/2010 | ........... F16H 15/503 |
| CN | 110375036 A | * | 10/2019 | ............... F16H 1/32 |
| GB | 2566528 A | * | 3/2019 | ............. F16H 15/16 |

*Primary Examiner* — Justin Holmes
(74) *Attorney, Agent, or Firm* — ARC IP LAW, PC; Joseph J. Mayo

(57) ABSTRACT

Infinitely variable multi-epicyclic friction transmission system including a main shaft, ball race discs, a splined tube, and twin planetary cone assemblies attached to a planetary carrier and disposed circumferentially around the splined tube. Each twin planetary cone assembly comprises a torque tube and a planetary cone-hemisphere structure comprising a planetary cone integral with hemisphere at its apex, wherein the planetary cone-hemisphere structure rolls inside the torque tube via the hemisphere, and wherein a slant height of the twin planetary cone assemblies is parallel to the main shaft. System also includes a series of spherical planets, a reaction ring disposed around the twin planetary cone assemblies configured to slide along the planetary cone assemblies to vary a gear ratio, and ball gear retaining rings. Each of the ball gear retaining rings is mounted on one of a plurality of ball gears which are mounted on the ball race discs.

12 Claims, 28 Drawing Sheets

(56) References Cited

U.S. PATENT DOCUMENTS 4,296,647 A    10/1981   Kemper
7,762,920 B2 *   7/2010   Smithson ............... B62M 23/00
                                                                                 476/36

* cited by examiner

INFINITELY VARIABLE MULTI-EPICYCLIC FRICTION TRANSMISSION SYSTEM FOR ELECTRIC MOTOR

This application is a continuation-in-part of U.S. patent application Ser. No. 17/323,160, filed 18 May 2021, which is a continuation-in-part of U.S. patent application Ser. No. 16/560,041, filed 4 Sep. 2019, issued as U.S. Pat. No. 11,009,107, the specifications of which are hereby incorporated herein by reference.

BACKGROUND OF THE INVENTION

Field of the Invention

At least one embodiment of the invention relates to electric motors, and in particular to an infinitely variable transmission system for electric motors.

DESCRIPTION OF THE RELATED ART

An electric vehicle (EV), also referred to as an electric drive vehicle, uses one or more electric motors or traction motors for propulsion. An electric vehicle may be powered through a collector system by electricity from off-vehicle sources, or may be self-contained with a battery or generator to convert fuel to electricity. EVs include road and rail vehicles, surface and underwater vessels, electric aircraft and electric spacecraft.

In the context of electric road vehicles, at present 'range anxiety' is not a problem for city driving with a short commute to work and leisure activities. However, 'range anxiety' occurs for long journeys over 100 kilometres.

Continuously variable transmission (CVT), also known as a single-speed transmission, stepless transmission, pulley transmission, or, in case of motorcycles, a twist-and-go, is an automatic transmission that can change seamlessly through a continuous range of effective gear ratios. This contrasts with other mechanical transmissions that offer a fixed number of gear ratios. The flexibility of a CVT allows the input shaft to maintain a constant angular velocity. A belt-driven design offers approximately 88% efficiency, which, while lower than that of a manual transmission, can be offset by lower production costs and by enabling the engine to run at its most efficient speed for a range of output speeds. When power is more important than economy, the ratio of the CVT can be changed to allow the engine to turn at the RPM at which it produces greatest power. This is typically higher than the RPM that achieves peak efficiency. In low-mass low-torque applications a belt-driven CVT also offers ease of use and mechanical simplicity. Steel belt-driven CVTs are now the dominant variable transmission used in cars.

Epicyclic gearing or planetary gearing is a gear system comprising one or more outer gears, or planet gears, revolving about a naseral, or sun gear. Typically, naser gears are mounted on a movable arm or carrier which itself may rotate relative to the sun gear. Epicyclic gearing systems also comprise an outer ring gear or annulus, which meshes with the planet gears. Planetary gears, or epicyclic gears, are typically classified as simple or compound planetary gears. Simple planetary gears have one sun, one ring, one carrier, and one planet set. Compound planetary gears may comprise one or more of the following three types of structures: meshed-planet—there are at least two more planets in mesh with each other in each planet train, stepped-planet—there exists a shaft connection between two planets in each planet train, and multi-stage structures—the system contains two or more planet sets. Compared to simple planetary gears, compound planetary gears have the advantages of larger reduction ratio, higher torque-to-weight ratio, and more flexible configurations.

Epicyclic gearing with toothed gear wheels is very common in automatic gear boxes. A friction drive or friction engine is a type of transmission that, instead of a chain and sprockets, uses two wheels in the transmission to transfer power to the driving wheels.

The problem with this type of drive system is that it is not very efficient. Trying to duplicate epicyclic gearing with friction drives is very difficult because if the planets are mounted on fixed stubs and at fixed distances from each other, they cannot be forced against other components to give a friction drive.

A cone CVT varies the effective gear ratio using one or more conical rollers. The simplest type of cone CVT, a single-cone CVT, uses a wheel that moves along the slope of the cone, creating the variation between the narrow and wide diameters of the cone. In a planetary CVT, the gear ratio is shifted by tilting the axes of spheres in a continuous fashion, to provide different contact radii, which in turn drive input and output discs. The system can have multiple planets to transfer torque through multiple fluid patches.

In view of the above, there is a need to provide an improved transmission system for electric motors, as it is no longer a question of whether electric vehicles will form a significant part of transportation. The quest now is to get a greater range with a given charge. Undoubtedly, battery technology will be the key here with nanotechnology playing a major role. An infinitely variable gearbox would also help but would have to be very efficient to make a significant contribution.

BRIEF SUMMARY OF THE INVENTION

The present disclosure provides a mechanism for increasing the torque capacity of an infinitely variable transmission system which relies solely on rolling friction. This is accomplished by having a stack of epicyclic friction gears in series.

The transmission system of the present disclosure may be configured to have sufficient torque at its output to drive the road wheels of a motor vehicle. The greatly enhanced output of torque that the system produces is by means of its multi-epicyclics stacked in series. These work in an analogous way to a multi-plate clutch where friction discs are compressed in series to transmit much more torque by static friction than by one pair of discs alone.

In a further aspect of the disclosure, there is provided an infinitely variable multi-epicyclic friction transmission system for an electric motor, the system comprising:
  a main shaft;
  a cylindrical drum which can be stepped down to a narrower diameter at one end and which is disposed axially around the main shaft; the drum configured to bear a series of inverted vee-rings or the like, and splined on an outer circumferential surface so that the rings can slide longitudinally along the cylindrical drum;
  an axial flux motor comprising a stator which is fixedly located in one of the casings side plates;
  a default thrust bearing mounted on the main shaft between the rotor and the stator to prevent physical contact therebetween;
  a plurality of twin planetary cone assemblies attached to the at least one planetary carrier and disposed circumferentially around the cylindrical drum each twin planetary cone assembly comprising: a torque tube and a planetary cone-hemisphere structure provided at each end of the torque tube, wherein each planetary cone-hemisphere structure comprises a planetary cone integral with a hemisphere at its apex, wherein each planetary cone-hemisphere structure is configured to roll inside a respective torque tube via a respective hemisphere, and wherein the slant height of each planetary cone is parallel to the main shaft;

a series of spherical planets configured to alternate with the series of inverted vee-rings, wherein the vee-rings are configured to be compressed together by a pressuriser ring at a distal end of the cylindrical drum, thus forcing the spherical planets radially outwards to abut the torque tubes; and further comprising:

at least one reaction ring disposed around each of the twin planetary cone assemblies and configured to slide along a planetary cone of each twin planetary cone assembly to vary a gear ratio;

a pressure plate between each planetary carrier and the base of the planetary cones such that pressure plates force the planetary cones inwards into the torque tubes providing frictional adhesion between the hemispheres and the torque tubes internally and the cones and torque tubes externally; and a plurality of idler planets mounted on a plurality of rods connecting planetary carrier halves.

The function of the axial flux motor is not only to rotate the planet carrier but to utilise its powerful magnetic force to attract the rotor and instantly compress the system when electric power is turned on, thus augmenting the pressurisation via the load.

In one or more embodiments, a circumference of each of the pressure plates has open ended slots such that a shaft of each twin planetary cone assembly can slide in them.

In one or more embodiments, the planetary cone and the torque tube are dimensioned such that their circles of contact are the same diameter on the torque tube and the hemispheres.

In one or more embodiments, the number of idler planets is double the number of the torque tubes.

In one or more embodiments, the diameter of each idler planet is less than or equal to about half the diameter of each torque tube.

In one or more embodiments, the electric motor is located at an extreme end of the system.

In one or more embodiments, the vee-rings are configured to be compressed together from the distal end of the cylindrical drum towards the motor end of the cylindrical drum thus forcing the spherical planets radially outwards.

In one or more embodiments, the rotor comprises a disc with magnets, in a halbach array or otherwise, bonded onto the surface facing the stator and mounted on the main shaft.

In one or more embodiments, each of the pressuriser rings is configured to be engaged with a splined driver on the main shaft.

In one or more embodiments, the pressuriser ring comprises bearings configured to roll on end rings disposed on the cylindrical drum, wherein, when the main shaft is rotated, the bearings roll on the end rings forcing the end rings to move longitudinally along the cylindrical drum and compress the vee-rings, forcing the spherical planets radially outwards.

In one or more embodiments, each planetary cone assembly is configured to move out radially away from the main shaft.

In one or more embodiments, the plurality of twin planetary cone assemblies are mounted in the planetary carrier.

In one or more embodiments, the at least one planetary carrier comprises two planetary carriers coupled to each other and mounted on the main shaft.

In one or more embodiments, the at least one reaction ring comprises two reaction rings disposed around the plurality of planetary cones on either side of the cylindrical drum and configured to slide along the planetary cones to vary a gear ratio.

In one or more embodiments, the system comprises between three and six twin planetary cone assemblies.

BRIEF DESCRIPTION OF THE DRAWINGS

The present application will now be described with reference to the accompanying drawings in which:

FIG. 14 shows a pressuriser ring and how it engages with an end ring, according to a second embodiment of the present disclosure;

FIGS. 20A to 29 show an alternative embodiment in which there are no idler planets, and the two pressuriser rings are replaced by a single pressuriser plate which is different in form and function to that illustrated in the previous Figures.

FIG. 20A shows the main shaft and the thrust bearing which is between the spider arms and the rotor tube.

FIG. 20D also shows thrust bearing which is between the new pressurizer plate and the end ball race disc.

FIG. 21 shows how two half planet carriers are combined together in a different way to the preceding embodiments.

FIG. 22 shows the rotor of the axial flux motor.

FIG. 23 is a perspective of ten ball race discs located around the main shaft and splined tube.

FIG. 24 shows a drawing with the same ten ball race discs and their associated ball gears.

FIG. 25 is the same FIG. 15 but without the two pressurizing rings.

FIG. 26 shows a cross section of the transmission according to the embodiment of FIGS. 20A-29.

FIG. 27 is the same as FIG. 17 except that the stator of the electric motor is in the right casing.

FIG. 28 shows the motor stator in the right casing and the default.

FIG. 29 shows as many components as possible without obscuring others.

DETAILED DESCRIPTION OF THE INVENTION

Figure 1:
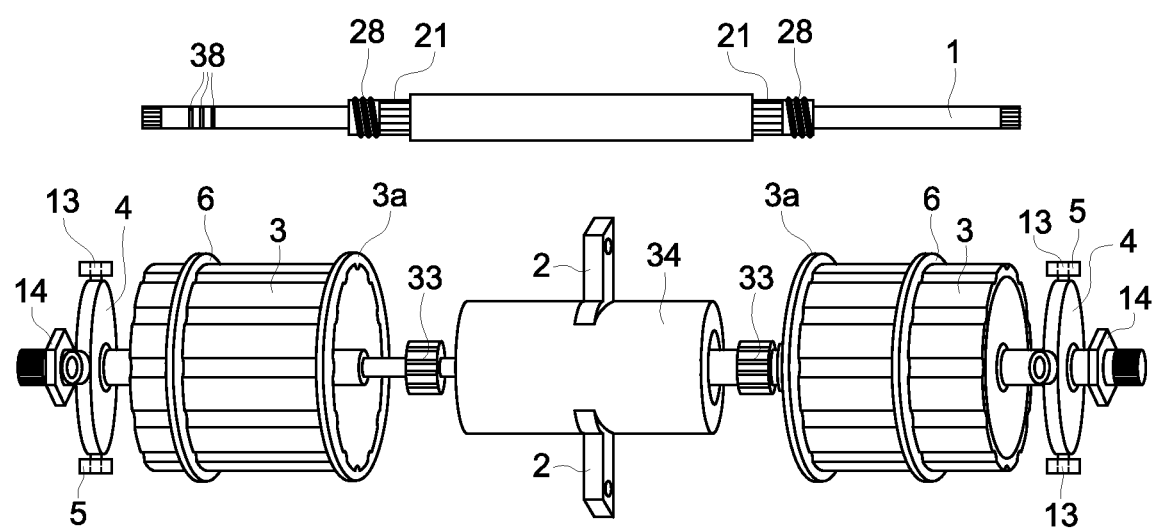
FIG. 1 illustrates an exploded view of some of the components of an infinitely variable multi-epicyclic friction transmission system according to an embodiment of the present disclosure.

The present disclosure provides an infinitely variable transmission system for an electric motor. The infinitely variable transmission system according to the present disclosure comprises a planetary cone transmission system, but unlike most planetary transmissions it has no toothed gear wheels whatsoever. The transmission system according to the present disclosure can therefore be classified as a friction gearing system. The driving force is produced by rolling friction only. Friction gearing is seldom used as it is incapable of transmitting much power.

The transmission system according to the present disclosure may be used for a range of electric motors.

Accordingly, the present disclosure provides an infinitely variable multi-epicyclic friction transmission system for an electric motor, the system comprising: a main shaft; a motor drum comprising two cylindrically shaped half-drums disposed axially around the main shaft and separated by a longitudinal gap, the half-drums configured to bear a series of inverted vee-rings splined on an outer circumferential surface of the half-drums so as to be configured to slide longitudinally along the half-drums; a rotor configured to be accommodated in a cavity defined by the half-drums, the rotor comprising a rotor carrier driver configured to be disposed in the longitudinal gap for rotating at least one planetary carrier about the main shaft; a plurality of twin planetary cone assemblies attached to the at least one planetary carrier and disposed circumferentially around the two half-drums, each twin planetary cone assembly comprising: a torque tube and a planetary cone-hemisphere structure provided at each end of the torque tube, wherein each planetary cone-hemisphere structure comprises a planetary cone integral with a hemisphere at its apex, wherein the planetary cone-hemisphere structure is configured to roll inside the torque tube via the hemisphere, and wherein the slant height of the planetary cones is parallel to the main shaft; a series of spherical planets configured to alternate with the series of inverted vee-rings, wherein the vee-rings are configured to be compressed together by a pressuriser ring at a distal end of each of the half-drums, thus forcing the spherical planets radially outwards to abut the torque tubes; and further comprising: at least one reaction ring disposed around the plurality of planetary cones and configured to slide along the planetary cones to vary a gear ratio.

The at least one reaction ring may comprises two reaction rings disposed around the plurality of planetary cones on either side of the half-drums and configured to slide along the planetary cones to vary the gear ratio. The basic principle of the system is to force the twin planetary cone assemblies onto the reaction rings with as great a force as possible. When multi-epicyclics are connected in series the original force is transmitted to the next member and so on. The at least one planetary carrier may comprise two planetary carriers coupled to each other and mounted on the main shaft.

The system of the present disclosure may be configured to have sufficient power at its output to drive the road wheels of a motor vehicle. The greatly enhanced torque output that the system produces is by means of multi-epicyclics stacked in series. This is analogous to a multiplate clutch where friction discs are compressed in series to transmit much more torque by static friction than by one pair of discs alone.

In the system described herein where rolling friction is involved there are a series of inverted vee-rings alternating with a series of spherical planets therebetween. Each vee-ring and each spherical planet together constitute a separate epicyclic gear train; the vee-ring being the sun gear, the spherical planet the inner planet and the torque tube their common outer planet. Hence the term multi-epicyclic used throughout the description. The vee-rings and the intermediate spherical planets are configured to be compressed and the spherical planets forced out radially.

The system described has a plurality of twin planetary cone assemblies. Between three and six such assemblies may be employed. It has been determined through experimentation that six such assemblies is the maximum that can advantageously be used. Using six assembles may not transmit more power but due to the very high forces involved the load may be distributed over a greater number of components. The twin planetary cone assemblies may be mounted in at least one planetary carrier. Each twin planetary cone assembly may comprise two largely hollow planetary cones inside a torque tube. The two planetary cones, one at each end of the torque tube may be configured to transmit power at a fixed angle unlike a constant velocity joint in a car where the angle can vary. The reason for the fixed angle is to keep the slant height of the planetary cone parallel to the main axis. By keeping the slant height of the planetary cone parallel to the main axis, the one or more reaction rings can slide easily along the cones to vary the gear ratio.

Figure 2:
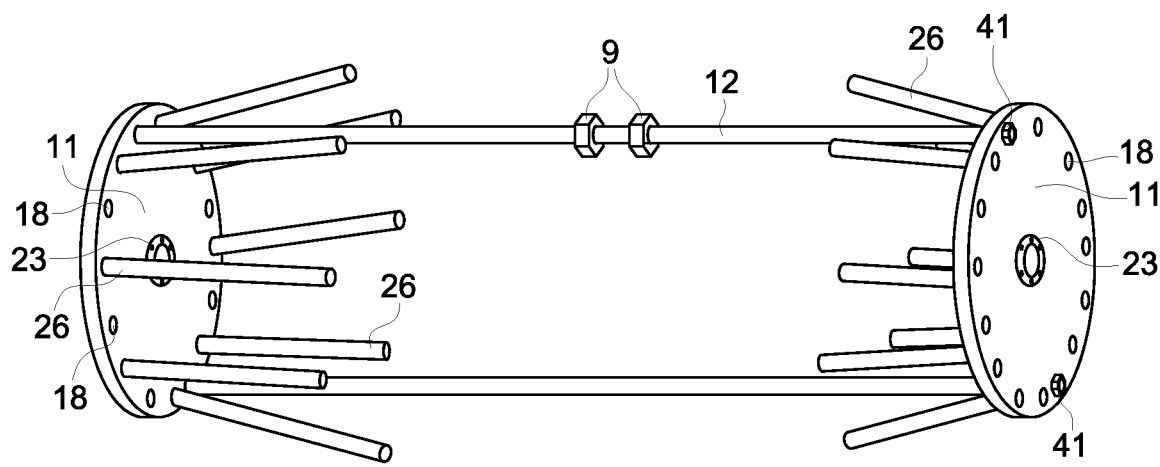
FIGS. 2 and 2a illustrate two different types of planetary carrier, according to embodiments of the present disclosure.

The vee-rings and the intermediate spherical planets are configured to be compressed and the spherical planets forced out radially. Such compression may be effected in a number of ways. FIGS. 1 and 2 illustrate an example of a configuration for achieving such compression, according to an embodiment of the present disclosure.

FIG. 1 illustrates an exploded view of some of the components of an infinitely variable multi-epicyclic friction transmission system according to an embodiment of the present disclosure. More specifically, FIG. 1 illustrates a main shaft 1, a motor rotor 34, a motor drum comprising two half-drums 3 for accommodating a motor, and two pressuriser rings 4, and how they are assembled together. The motor drum comprising two half-drums 3 are disposed axially around the main shaft 1. That is, the main shaft 1 extends longitudinally through a centre of the motor drum. The half-drums 3 extend longitudinally parallel to the main shaft 1. Slip rings 38 may be provided on the main shaft 1 to feed power into the motor, as illustrated in FIG. 1. It can be seen in FIG. 1 that there is ample space inside the half-drums 3 to accommodate an electric motor, or specifically, the rotor 34. This is a major feature of the system in that space is saved by having the motor inside the transmission. Referring to FIG. 1, the transmission is pressurized from the outer ends towards the centre. This will be explained later. In the embodiment illustrated in FIG. 1, a single electric motor may fit neatly in the centre of the transmission. The motor drum constitutes the stator of the electric motor, and defines a cavity therethrough for accommodating the rotor 34. The half-drums 3 may be splined to allow vee-rings 6 to slide longitudinally along an outer circumference of the half-drums 3. Open ends of the half-drums 3 are configured to face each other. Magnets may be mounted on the inner circumference of each half-drum 3. Each identical half-drum 3 comprises two concentric cylinders with an apertured disc welded onto a distal end thereof. The two concentric cylinders comprise an inner cylinder and an outer cylinder. The inner cylinder or more properly a tube is slightly longer than the outer cylinder so that when the half-drums 3 are brought together a longitudinal gap is defined between the two outer cylinders. The longitudinal direction will be understood as being in the direction of the main shaft 1. The rotor comprises a rotor carrier driver 2 configured to be disposed in the longitudinal gap for rotating at least one planetary carrier about the main shaft 1. The rotor 34 does not drive the main shaft 1 directly but indirectly through the infinitely variable transmission system. The rotor carrier driver 2 may comprise one or more rotor carrier driver stubs 2 mounted on the centre of the rotor 34 which can rotate freely in the longitudinal gap. The one or more rotor carrier driver stubs 2 may be configured to protrude radially from the centre of the rotor and configured to rotate in the longitudinal gap. Referring to FIG. 1, the rotor carrier driver 2 may comprise two diametrically opposite rotor carrier driver stubs 2 mounted on the centre of the rotor 34 which can rotate freely in the longitudinal gap. In this manner, the rotor 3 can be rotated around the main shaft 1. Roller bearings 33 may be provided on the main shaft 1 to allow the rotor 34 to rotate about the main shaft 1. One or more rods connected to the at least one planetary carrier may be configured to pass through the one or more rotor carrier driver stubs, thus allowing the rotor to drive the planetary carrier. More specifically, rods connecting the at least one planetary carrier together pass through apertures in the one or more rotor carrier driver stubs 2 and by this means the rotor 34 drives the at least one planetary carrier. The at least one planetary carrier will be described later.

Referring to FIG. 1, flanges 3a may be provided at the open ends of the half-drums 3 to keep the vee-rings 6 on the half-drums 3. FIG. 1 shows just one vee-ring 6 on each half-drum 3. The more vee-rings the more torque the transmission can handle. There is a limit to the number of vee-rings that can be practically used. In one embodiment, five vee-rings may be used on each half-drum 3; see FIG. 10. The vee-rings may be of triangular section as the term vee-rings suggest, but the vee-rings may also be of curved section. In this case the vee-rings may resemble inner races of two ball thrust bearings, back to back. The radius of curvature of the spherical planets may be only slightly less than the radius of curvature of the vee-rings. In a ball thrust bearing, the ball bearings are free to move outwards in their cages but they do not move to any appreciable extent before they are forced against the outer race. A very important point to note with this transmission is that the spherical gears behave in a similar fashion. The spherical gears are free to move out but do not to any appreciable extent because in this case the space between the torque tubes prevents them from doing so.

Figure 3:
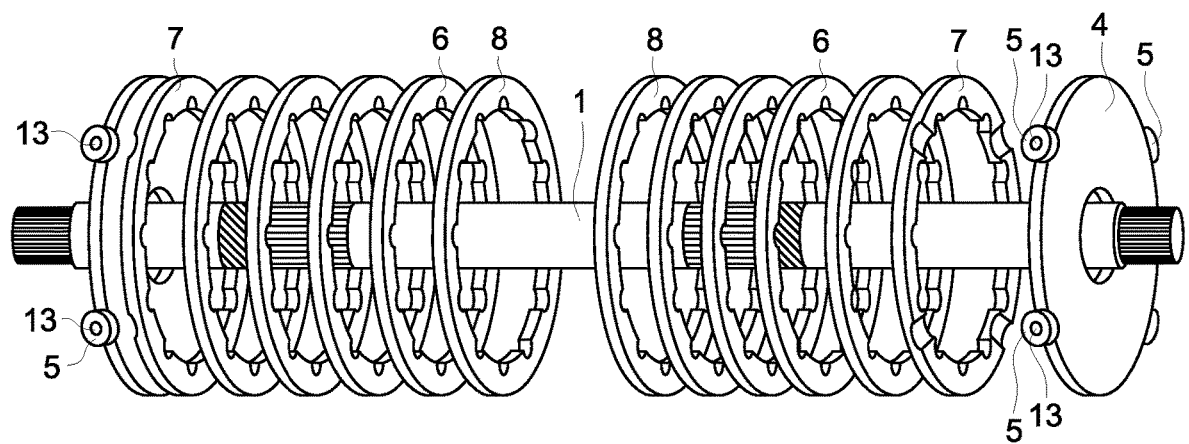
FIGS. 3 and 4 illustrate a structure in which a series of vee-rings and intermediate spherical gears are loaded about a main shaft of the mechanism of FIG. 1, according to an embodiment of the present disclosure.
Figure 4:
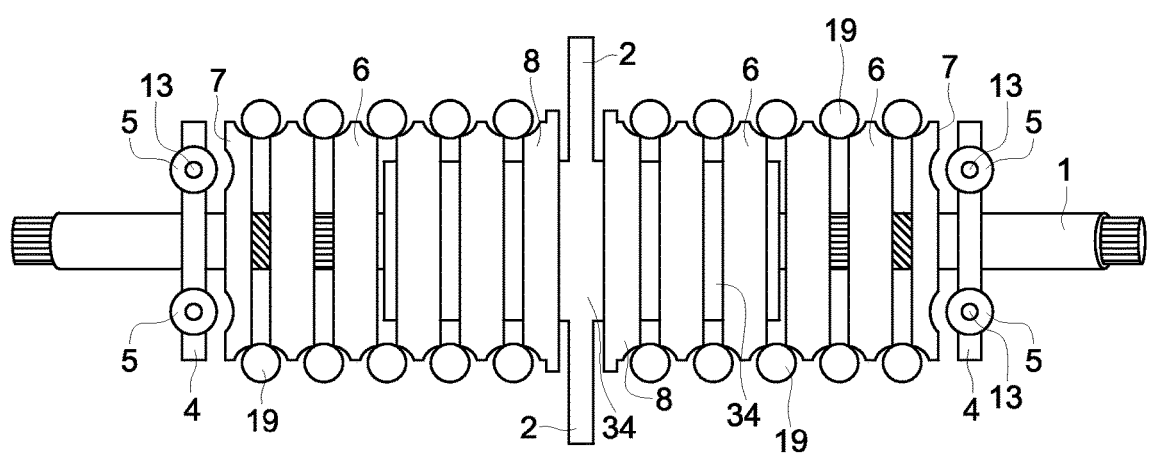

FIG. 1 illustrates a pressuriser ring 4 at both ends of the transmission, according to an embodiment of the present disclosure. Each of the pressuriser rings 4 comprises an apertured disc having a plurality of outer arms 13. In the embodiment illustrated in FIG. 1, the pressuriser ring 4 comprises four outer arms 13. A roller bearing 5 may be provided on each outer arm 13. The roller bearings 5 may be configured to engage with end rings 7 on each side of the transmission. The end rings 7 are illustrated in FIGS. 3 and 4 for example. Each of the pressuriser rings 4 may be configured to be engaged with a splined driver on the main shaft 1. The two pressuriser rings 4 may be splined on to the main shaft 1 and may be secured by nuts 14.

Figure 2A:
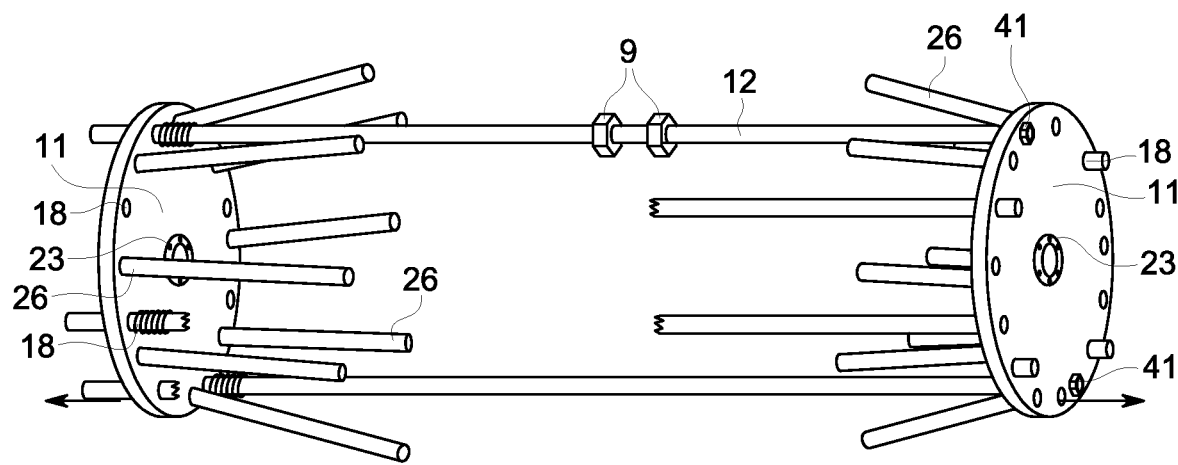

FIGS. 2 and 2a illustrate two different types of planetary carrier 11, according to embodiments of the present disclosure. Each planetary carrier 11 may have eight planetary cone shafts 26 fixedly attached to an apertured disc. In one embodiment, illustrated in FIG. 2, rods 12 keep the planetary carriers 11 a fixed distance apart; in the other, illustrated in FIG. 2a, the planetary carriers 11 can move apart. Rotor positioning nuts 9 may be provided on the rods 12 for positioning the rotor 34.

FIG. 2 shows two planetary carriers 11 attached together with connecting rods 12. Only two connecting rods 12 are shown for clarity. The two diametrically opposite connecting rods 12 may be threaded through apertures 18 in the rotor carrier driver 2.

In FIG. 2a the planetary carriers 11 are similar in appearance to the planetary carriers 11 of FIG. 2, but operate in a completely different way and use a different type of planet. The arrangement of FIG. 2a also proves much greater adhesion between the contact surfaces. Whereas in FIG. 2, the planets are forced out radially by having them slide towards the centre, in FIG. 2a the planets are held longitudinally stationary and the planetary carriers 11 pulled apart, thereby forcing the planets out radially. This mechanism enables the torque tube to contact the cone in two places and the cone to contact the reaction ring. The really significant thing is that all these three contacts are pressurised in series.

FIG. 2a represents an expandable planetary carrier 11. The planetary carriers 11 of FIG. 2a which are of an expandable design may also be mounted on the main shaft 1 with the same bearings but are not bolted together. The arrangement of FIG. 2a is a modification of the embodiment of FIG. 2 which has eight connecting rods 12 each of which has both ends fixedly attached to its planetary carrier 11. The arrangement of FIG. 2a has four connecting rods 12 fixedly attached to one of the planetary carriers 11. The other ends of the connecting rods 12 are free to slide in apertures 18 in the other planetary carrier 11. The apertures 18 in the planetary carriers 11 may be provided with a greased bush bearing. The free ends of the connecting rods 12 may have springs anchored at their ends to assist in pushing the planetary carriers 11 apart and provide initial adhesion. The planetary carriers 11 of FIG. 2a although of a more complicated design allows for a superior pressurizing mechanism which will be explained in later figures.

FIG. 3 is a perspective view illustrating a series of the vee-rings 6 arranged about the main shaft 1, according to an embodiment of the present disclosure. The series of vee-rings 6 comprises two banks of vee-rings 6 on either side of the main shaft 1. In the embodiment illustrated in FIG. 3, the series of vee-rings 6 comprises four vee-rings 6 on either side of the main shaft 1. As illustrated in FIG. 4, the rotor 34 is positioned between the two banks of four vee-rings 6 on either side. It will be understood that the vee-rings 6 are provided on an outer circumferential surface of the half-drums 3, wherein the vee-rings 6 are configured to slide along the half-drums 3. Four vee-rings 6 may be bounded on one side by an end ring 8 with an incline on one side only. On the other side is an end ring 7 with an incline on one side only but with cam inclines on the other side.

FIG. 4 is a cross-sectional view of the structure of FIG. 3 according to an embodiment of the present disclosure. Referring to FIG. 4, spherical planets 19 are illustrated. The spherical planets 19 may be considered to be frictional ball gears. The spherical planets 19 are in a real sense gears and can be considered to be the inner planets of an epicyclic gear set.

Figure 9:
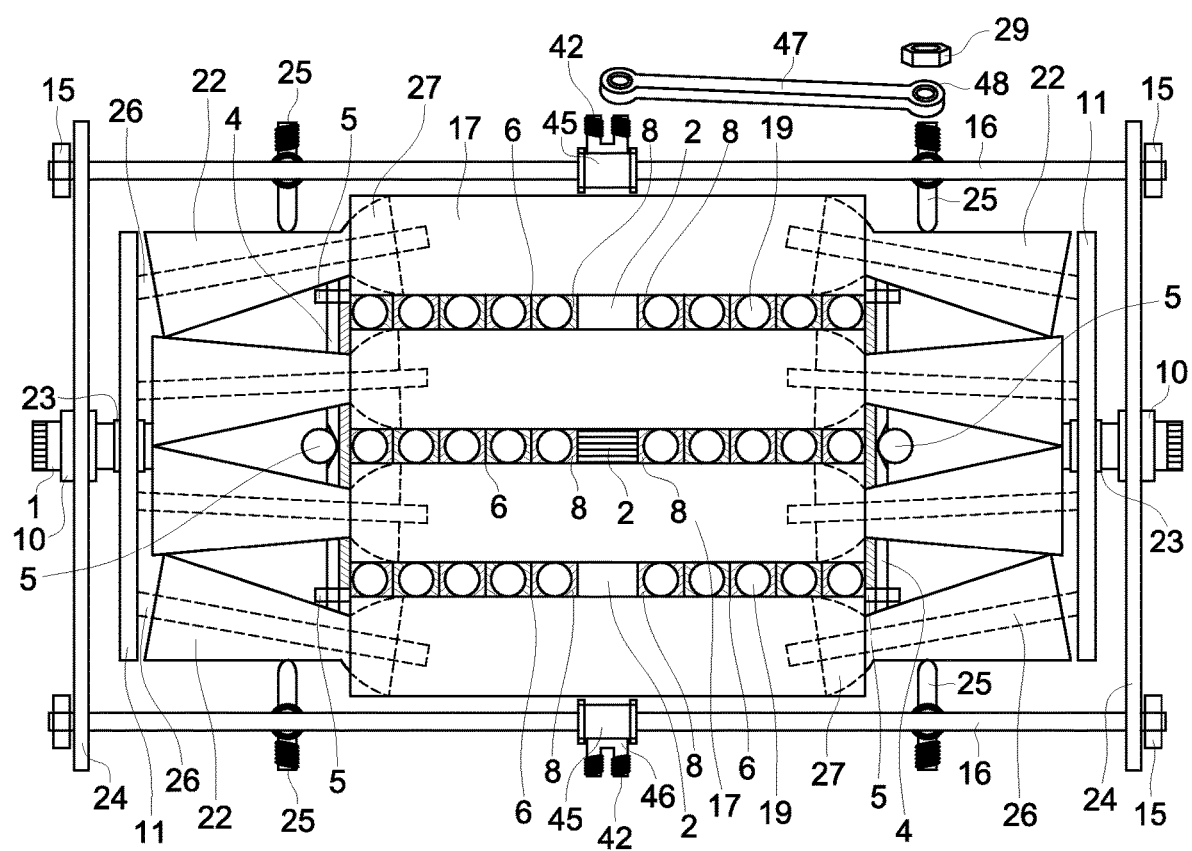
FIG. 9 illustrates a multi-component view of an infinitely variable transmission system according to an embodiment of the present disclosure.

The circumference of the v-rings 6 may be of triangular section or curved section as illustrated in FIG. 4. With the curved section the v-rings 6 may be exactly the same as the inner races of the spherical planets 19. The individual vee-rings 6 in FIG. 4 are like two such inner races welded together back to back. The circular curves of the vee-rings 6 may have a slightly greater radius than the radius of the spherical planets 19. Unlike a ball bearing a cage is not required as the torque tubes space the bearings. In FIG. 4, compression of the end rings 7 forces the spherical planets 19 into the space between the torque tubes, as illustrated in FIG. 4C and FIG. 9.

Figure 4A:
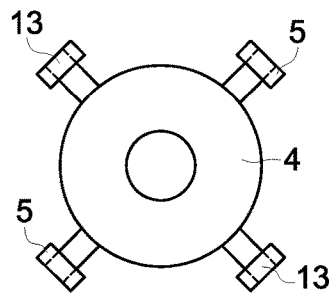
FIGS. 4A and 4B show a pressuriser ring and how it engages with an end ring, according to an embodiment of the present disclosure.
Figure 4B:
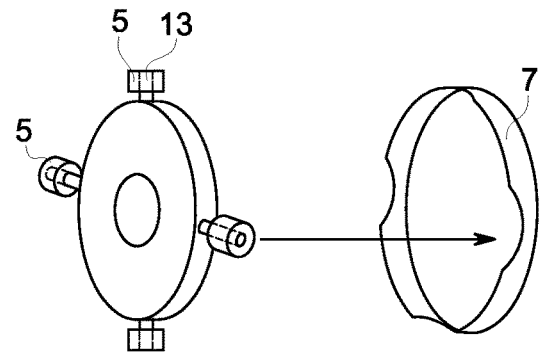

FIGS. 4A and 4B illustrate the pressuriser rings 4 and how they engage with the end rings 7 on the main shaft 1, according to an embodiment of the present disclosure. The pressuriser rings 4 are configured to be splined onto the main shaft 1. FIG. 4A is an end view of the pressuriser ring 4 with four roller bearings 5 on each outer arm 13. FIG. 4B shows how the roller bearings 5 fit into the cams of the end ring 7. FIG. 4C is a schematic drawing of how the pressuriser ring 4 works and how a force of one unit generates a radial force of twenty units. That is, the pressuriser rings 4 function to compress the vee-rings 6 and the intermediate spherical planets 19 together and force the spherical planets 19 out radially. The greater the load the transmission encounters, the greater the force. Referring to FIG. 4C, each planetary cone assembly comprises a torque tube 17 constituting a common outer planet attached to a planetary cone 22 at each end thereof. The slant height of the planetary cone 22 is parallel to the main shaft 1. A reaction ring 25 is disposed around each planetary cone 22 and configured to slide along the planetary cone 22 to vary a gear ratio.

Figure 4C:
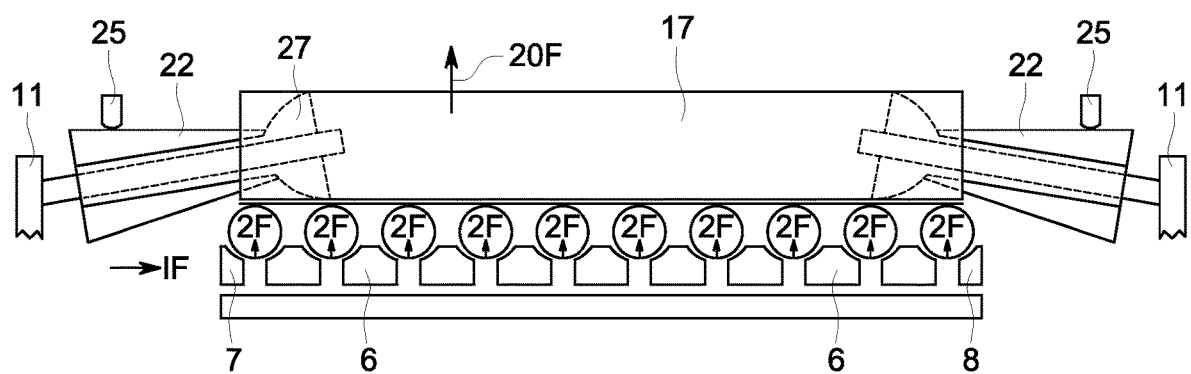
FIG. 4C is a schematic of the forces involved when the transmission is pressurised.

Referring to FIGS. 1 and 4C, the pressuriser ring 4 with roller bearings 5 may be configured to be slid onto the main shaft 1 and engage with the end rings 7. If the main shaft 1 is rotated in one direction and then in the other direction the pressuriser ring 4 will move several degrees each way. The roller bearings 5 of the pressuriser ring 4 roll on the end rings 7 forcing the end rings 7 out sideways or in a longitudinal axis direction. Thus, when the main shaft 1 is rotated, the bearings 5 of the pressuriser ring 4 roll on the inclines of the end rings 7 forcing the end rings 7 to move longitudinally along the half-drums 3 and compress the vee-rings 6, forcing the spherical planets 19 radially outwards.

Figure 5:
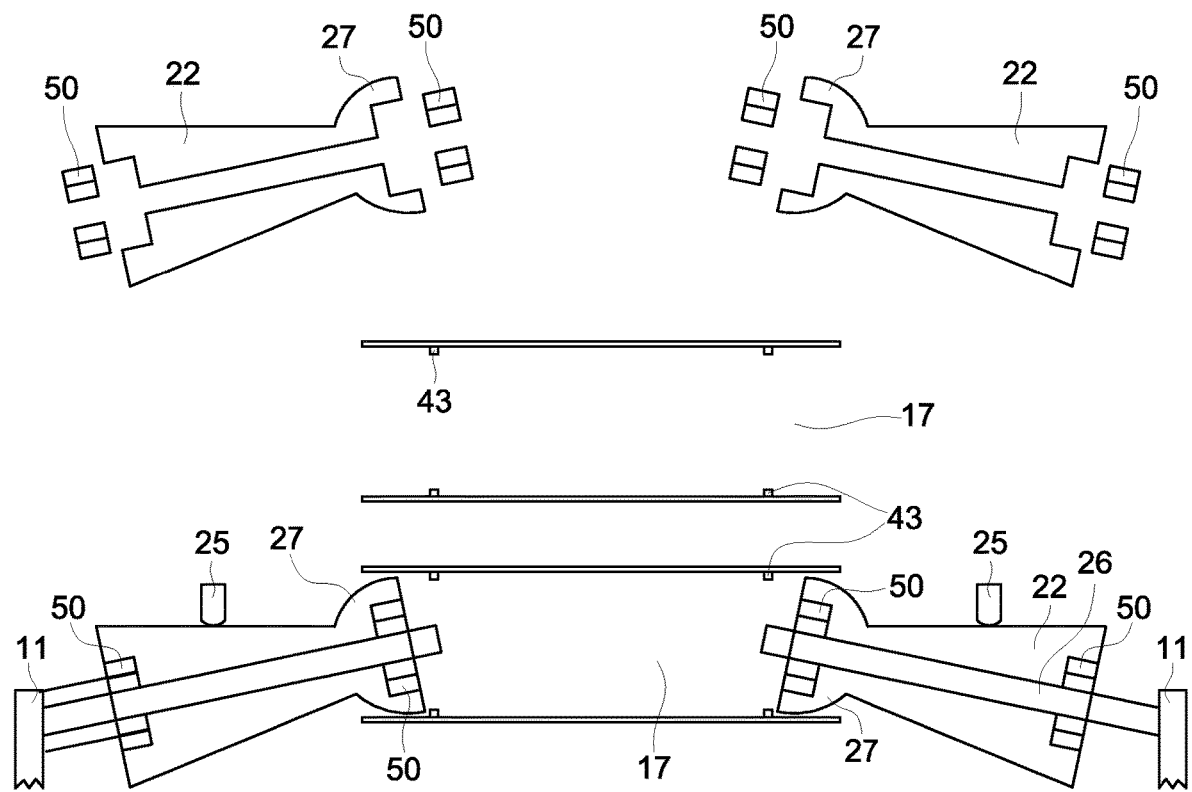
FIGS. 5 and 5A illustrate two planetary cone-hemisphere arrangements, according to embodiments of the present disclosure.
Figure 5A:
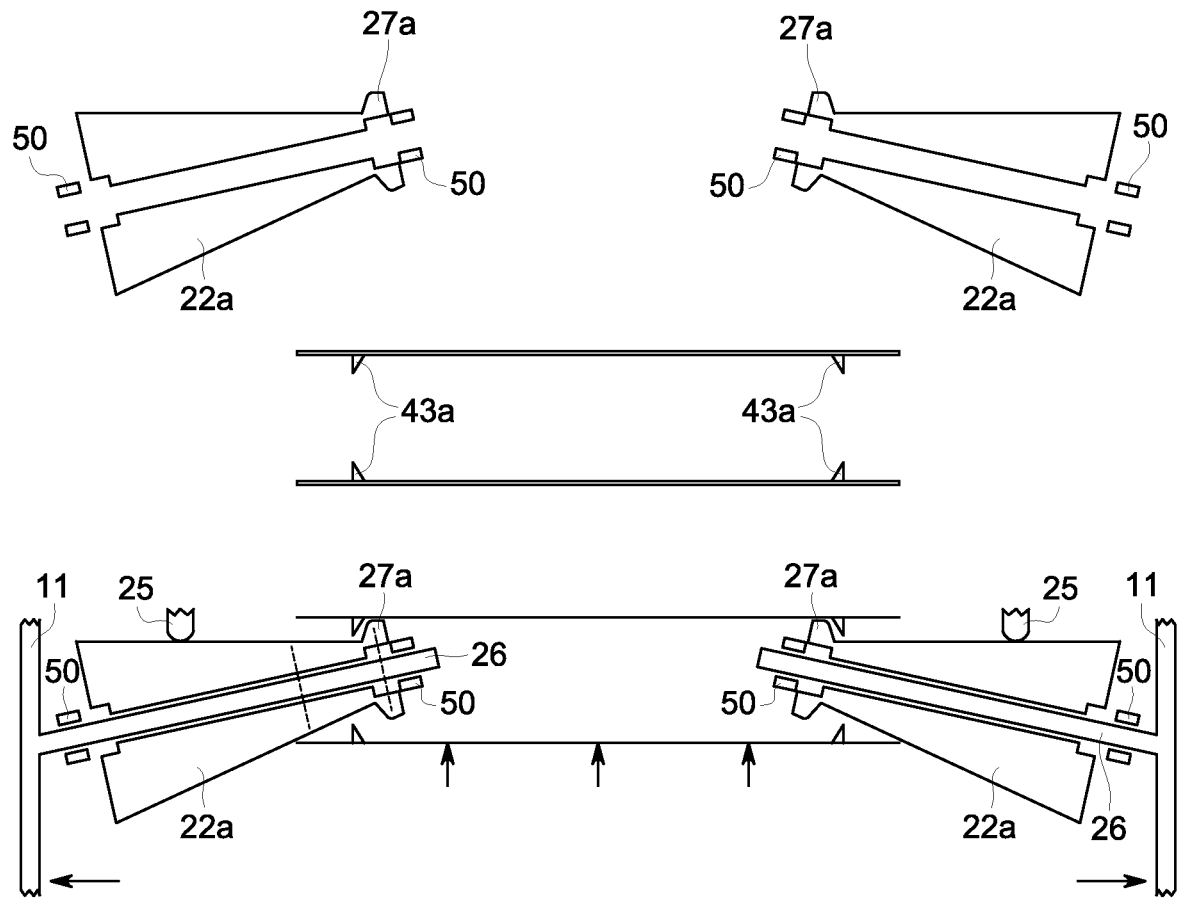

FIGS. 5 and 5A illustrate twin planetary cone assemblies according to embodiments of the present disclosure. Each twin planetary cone assembly comprises two planetary cone-hemisphere structures at either end of a torque tube 17. FIG. 5 illustrates two planetary cone-hemisphere structures. Referring to FIG. 5, each planetary cone-hemisphere structure 22 comprises a planetary cone 22 integral with a hemisphere 27 at its apex. Each planetary cone-hemisphere structure may be mounted on a planetary cone shaft 26. The planetary cone shafts 26 may be attached to the planetary carriers 11 at such an angle that the slant height of the mounted planetary cones 22 is parallel to the main axis 1.

Each twin planetary cone assembly also comprises a torque tube 17. The torque tube 17 may be cylindrically shaped. The planetary cone-hemisphere structures may be provided at ends of the torque tube 17. The hemispheres 27 may be configured to be a sliding fit inside the torque tube 17. The torque tube 17 may comprise a plurality of fixed rings 43 on inner surfaces thereof and integral with the torque tube 17. The fixed rings 43 may be configured to prevent excessive longitudinal float of the torque tube 17.

A small space may be left between the ends of the hemispheres 27 and the ends of the planetary cone shafts 26 so that the planetary cones 22 can move out radially and consequently the torque tubes 17. This arrangement—a shaft inside a hollow tube—enables the torque tube 17 to move out radially, while the planetary cone shaft 26 being fixed in the planetary carrier 11 cannot and remains at a fixed radial distance. It is the potential to move out radially that is important. The torque tube 17 and the spherical planets 19 may be configured to move out radially causing the torque tubes 17 to diverge from each other and the spherical planets 19 to escape. The spherical planets 19 may be configured to abut the reaction rings 25 so that the torque tubes 17 cannot move out radially. However, the spherical planets 19 can be pressurized and this disclosure shows how great the pressure between components can be. Referring to the embodiment of FIG. 2A, as well as the planetary carriers 11 being free to move laterally apart, the planetary cone-hemisphere structures may be configured to slide on the planetary cone shafts 26. Once the planetary cones 22 abut the reaction rings 25 all these movements stop.

The embodiment of FIG. 5A uses the planetary carrier 11 of FIG. 2a and a different planetary cone-hemisphere structure according to another embodiment of the present disclosure. The planetary cone-hemisphere structure of FIG. 5 comprises a hemisphere 27 attached to a planetary cone 22, wherein the hemisphere 27 is a sliding fit inside the torque tube 17. In FIG. 5A the hemisphere 27a of the planetary cone-hemisphere structure has an outer diameter significantly less than the internal diameter of the torque tube 17. In addition, the hemisphere 27a of FIG. 5A is configured such as to have a conical surface facing the planetary cone 22a itself. There is line contact by pure rolling friction between this conical surface and conical rings 43a inside the torque tube 17. The conical rings 43a perform a completely different function to the fixed rings 43 in FIG. 5 which keeps the torque tube 17 in place and is subjected to no great pressure. The conical rings 43a are configured to prevent the planetary cones 22a being pulled out of the torque tube 17 under great force.

The ends of the torque tube 17 are forced out against the planetary cones 22a. The circle of contact, represented by dotted lines in FIG. 5A, may be of equal diameter to the circle of contact the planetary cone-hemisphere structure makes with the torque tube 17. The set-up position is as in FIG. 5A with the relevant surfaces in contact.

If initially there are gaps between the planetary cone-hemisphere structure and the conical rings 43a and between the planetary cones 22a and the reaction rings 25 one can examine what happens when the system is pressurized. The result of the outward radial force of the torque tube 17 on the planetary cones 22a may be to force the planetary cones 22a sideways and bring the planetary cone-hemisphere structure against the conical ring 43a. When the planetary cones 22a can go no longer sideways the component of the force acting on the planetary cone shaft 26 may force the planetary carrier 11 sideways forcing the planetary cones 22a against the reaction rings 25. The planetary cones 22a may be mounted on caged roller bearings 50 which are configured to slide along the planetary cone shafts 26. Having loaded the planetary cone-hemisphere assemblies onto each of the planetary carriers 11, the two planetary carriers 11 with their bearings may be positioned on each side of the main shaft 1. The torque tubes 17 may be aligned with their respective hemispheres and the two planetary carriers 11 bolted together with the rods 12. Two diametrically opposite rods 12 may be threaded through the rotor carrier driver 2. It is exactly the same for the expandable planet carrier of FIG. 2a except the halves are not bolted together.

Figure 6:
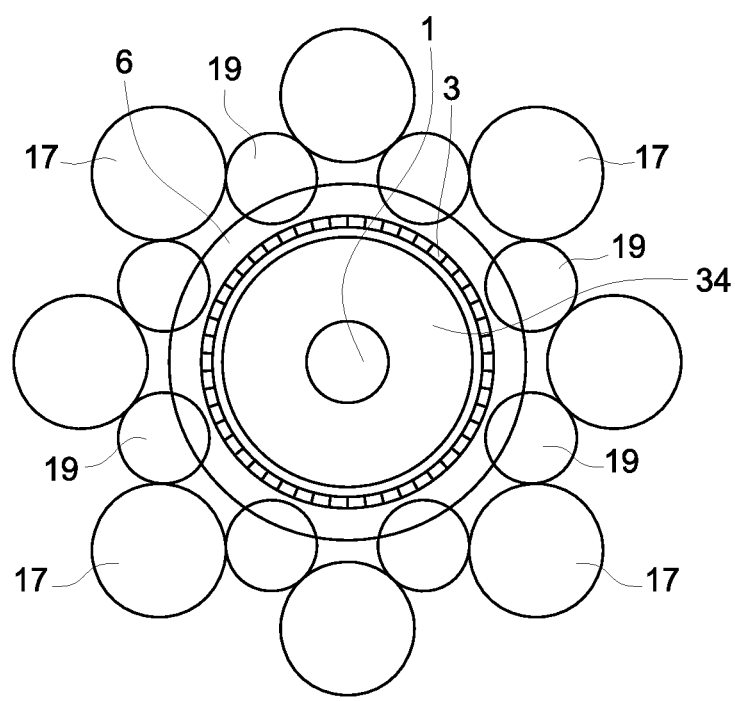
FIG. 6 illustrates an end view of the transmission mechanism, according to an embodiment of the present disclosure.

FIG. 6 shows an end view of the transmission mechanism according to an embodiment of the present disclosure. In the embodiment of FIG. 6, there are an equal number of torque tubes 17 and rows of spherical planets 19. In this embodiment there are no planetary shafts, spool bearings or rings around the spool bearings. Referring to FIG. 6, and starting at the centre, the transmission mechanism includes the main shaft 1, the rotor 34, the half-drums 3, the vee-rings 6, the spherical planets 19, and the torque tubes 17. FIG. 6 also shows that the spherical planets 19 are barely occluded, perhaps by as little as one fifth their diameter.

Figure 7:
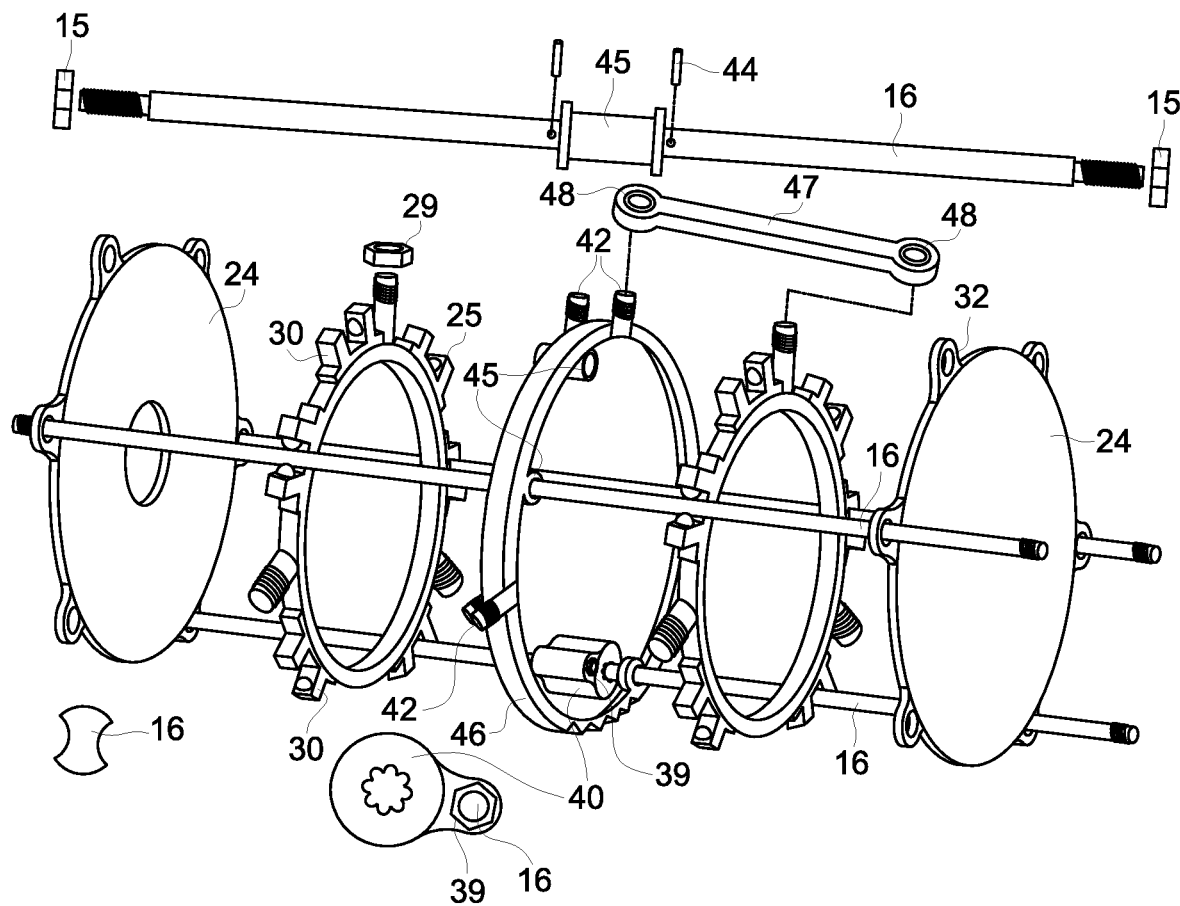
FIG. 7 is a perspective view of how all the outer components of the transmission system are configured and encased, according to an embodiment of the present disclosure.

FIG. 7 shows how all the outer components may be configured and encased, according to an embodiment of the present disclosure. Two end plates 24 and thru-fasteners 16 may all be tightly attached together via nuts 15. Such configuration may result in a very rigid structure. A control ring 46 may be disposed at the centre with the reaction rings 25 on either side. The control ring 46 may be mounted on the thru-fasteners 16 via spool-type bearings 45. Links 47 on each side of the control ring 46 connect the reaction rings 25 to the control rings 46. Turning the control ring 46 in either direction brings the reaction rings 25 closer together or further apart in unison, thereby varying the gear ratio. The control ring 46 may be operated by cable or a small part of its outer circumference may have spur gearing driven by a stepper motor. The thru-fasteners 16 may not be of circular section but may be concave shaped (diagonally opposite) to match the curvature of ball bearings 20 (illustrated in FIG. 8) as illustrated at the bottom of FIG. 7. The control ring 46 cannot move longitudinally because of the spool-type bearings 45. FIG. 7 shows the stepper motor 40 and a small part of the circumference of the control ring 46 which function as spur gearing. The stepper motor 40 is configured to operate the control ring 46. A nut 39 may be used to fix the stepper motor 40 to one of the thru-fasteners 16. FIG. 7 also illustrates a thru-fastener retaining pin 44.

Figure 8:
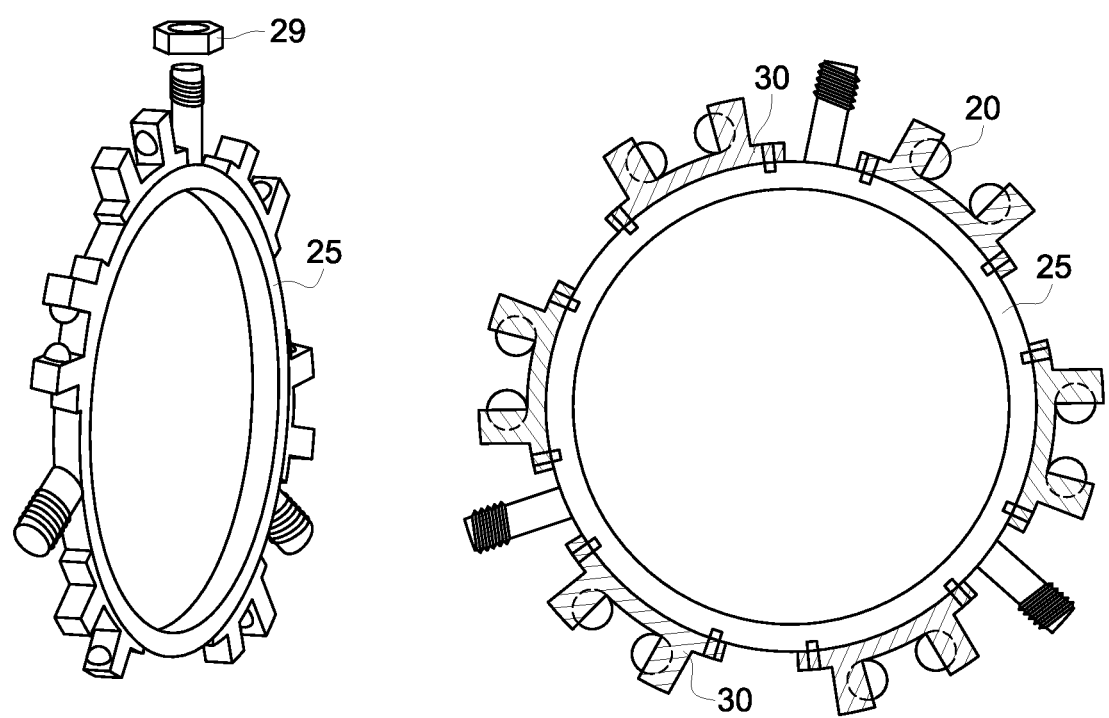
FIG. 8 illustrates two views of a reaction ring according to an embodiment of the present disclosure.

FIG. 8 illustrates two views of a reaction ring 25 according to an embodiment of the present disclosure. The reaction ring 25 may have a plurality of bearing mounts 30. Referring to FIG. 8, the reaction ring 25 according to the present embodiment has six double ball bearing mounts 30. Ball bearings 20 may be configured to rotate in the double ball bearing mounts 30 with very little friction. As illustrated in FIG. 7, the section of the thru-fastener 16 may be configured to exactly fit the space between the spherical planets 19. The links 47 may be bolted onto threaded stubs 42 on either side of the control ring 46 via link bearings 48. Stub nuts 29 may be used to connect the links 47 to the control ring 46 and the reaction rings 25.

FIG. 9 illustrates a multi-component view of an infinitely variable transmission system according to an embodiment of the present disclosure. FIG. 9 illustrates how the spherical gears 19 are positioned between the torque tubes 17. Referring to FIG. 9, the infinitely variable transmission system according to the present embodiment may comprise sixteen planetary cone shafts 26, eight torque tubes 17, and sixteen planetary cone-hemisphere structures 22. Altogether, the infinitely variable transmission system according to the present embodiment may comprise eighty spherical planets 19. As each spherical planet 19 has two points of contact this embodiment has no less than one hundred and sixty points of contact on the vee-rings 6. As the vee-rings 6 constitute part of the output, this is the final drive. These points of contact may be highly pressurized and the frictional grip or adhesion on the vee-rings 6 can handle as much torque as a toothed gear wheel. The large number of contact points ensures a wide distribution of the load. A brush gear may be contained in a small housing attached to the outside of the casing. The other components are described in detail in previous drawings. FIG. 9 illustrates a main shaft bearing 10 in the casing.

Figure 10:
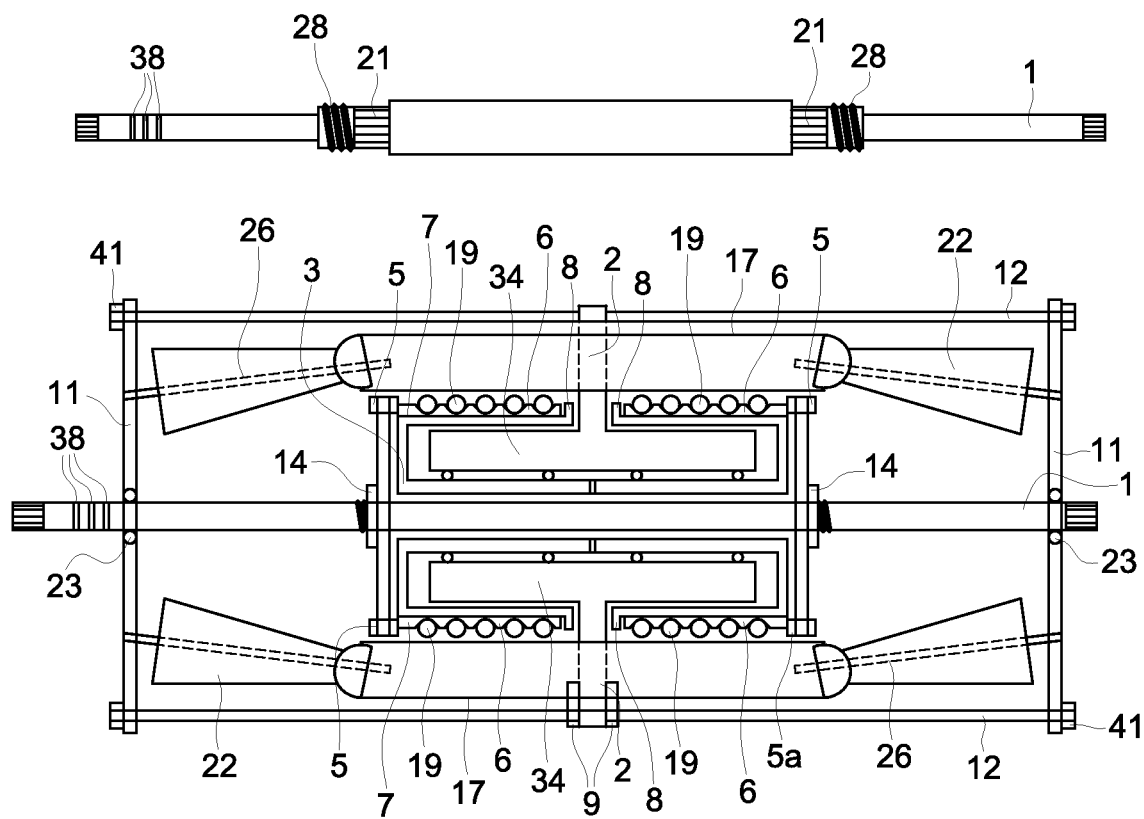
FIG. 10 shows as many of the components as possible without obscuring others.

FIG. 10 shows as many of the components as possible without obscuring other components. Referring to FIG. 10, splines 21 may be provided for splining the pressuriser rings 4 to the main shaft 1. Also illustrated in FIG. 10 is a carrier mount bearing 23, threads 28 for the pressuriser ring 4, and planet carrier assembly nuts 41.

The present disclosure features geared zero and crucial to accomplishing this in the four-element gear train are two reduction stages in the gear train. The first is in the joint between the planetary cones 22 and torque tubes 17 which is approximately 1:0.85. In other words 1 rev of the planetary cones 22 only gives 0.85 rev of the torque tubes 17. The second is between the spherical planets 19 and vee-rings 6 where the reduction is approx. 1:0.7. In effect they behave like compound gear wheels. The overall effect is that when the reaction rings 25 engage the planetary cones 22 at their maximum diameter, the output which is the main shaft 1 is stationary.

Initially, the main shaft 1, which is the output, is stationary, while the rotor 34 may be rotating at several thousand RPM. As the reaction rings 25 move along the planetary cones 22, the overall gear ratio changes from zero output to a gear ratio of approximately 1-3. This requires no final drive as such. The rotor 34 does not drive the main shaft 1 directly but indirectly through the infinitely variable transmission system.

In normal operation, the spherical gears 19 drive the vee-rings 6 and the vee-rings 6 being splined to the half-drums 3 drive the half-drums 3. At the same time, the end rings 7 engage with the pressuriser rings 4 which in turn drive the main shaft 1. In addition, the load the main shaft 1 encounters causes the pressuriser rings 4 to compress the end rings 7 inwards, thus forcing the spherical planets 19 radially outwards.

The electrically driven planetary cone transmission assembly of the present disclosure has several advantages over designs where input power is from another source. As the motor 'stator' is not fixed, use is made of the backward torque of the stator to compress the vee-rings and augment the forces driving the planet assemblies outwards. Many planetary designs can go from forward to reverse in one movement of the reaction rings. However, being electrically driven, one can simply reverse the rotation of the motor for reverse motion. This saves valuable ratio range. In this design, geared zero or neutral is when the reaction ring is at the larger diameter of the planetary cone. The assembly is basically an electric motor completely enveloped by the transmission. The stator differs from a typical motor stator in that it is precision made and balanced.

The purpose of any machine such as this is to drive a load, and via the pressuriser mechanism the load further compresses the vee-rings. The assembly uses three different forces to force the twin planet cone assemblies out onto the reaction rings. The three forces are:
 1. backward stator torque of the electric motor
 2. load torque
 3. centrifugal force This class of transmission is not only continuously variable but infinitely variable as well, i.e. it gives neutral or geared zero. Continuously variable transmissions can be adapted to become infinitely variable but they require an extra gear set.

Referring now to FIGS. 11A-D, 12, 12A and 13-19, there is provided alternative advantageous embodiments of the transmission system.

Figure 11A:
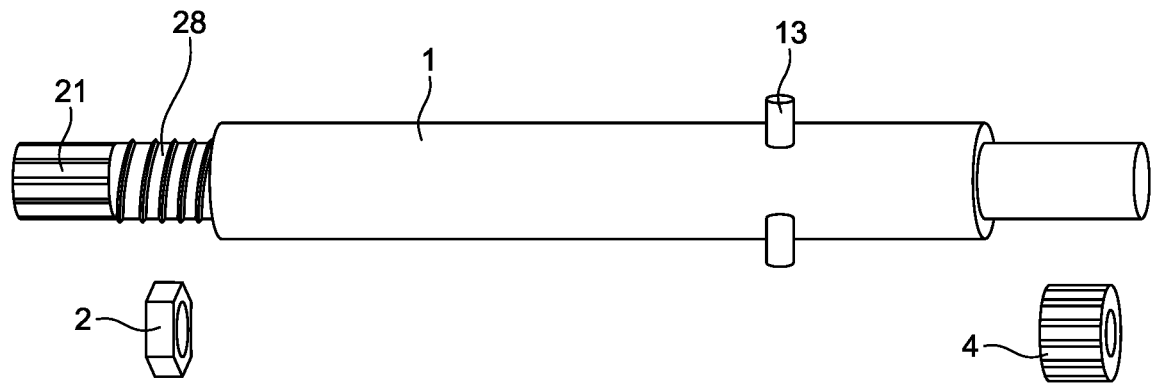
FIG. 11A-D illustrates an exploded view of some of the components of an infinitely variable multi-epicyclic friction transmission system according to a second embodiment of the present disclosure.
Figure 11B:
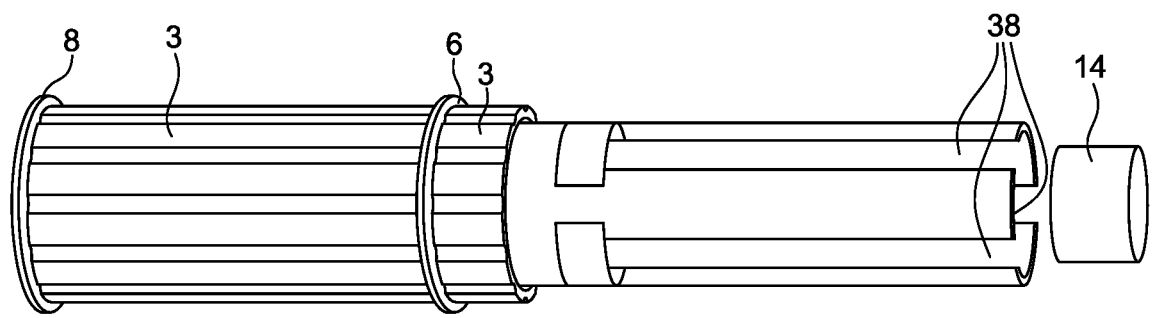
Figure 11C:
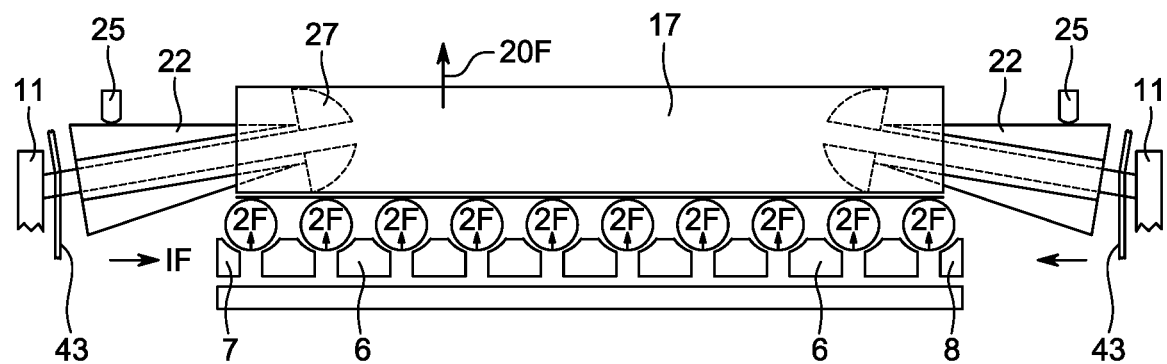
Figure 11D:
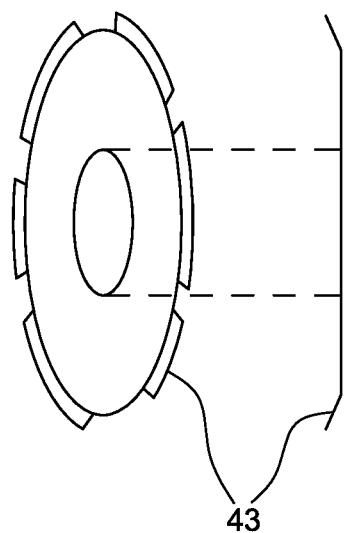
Figure 15:
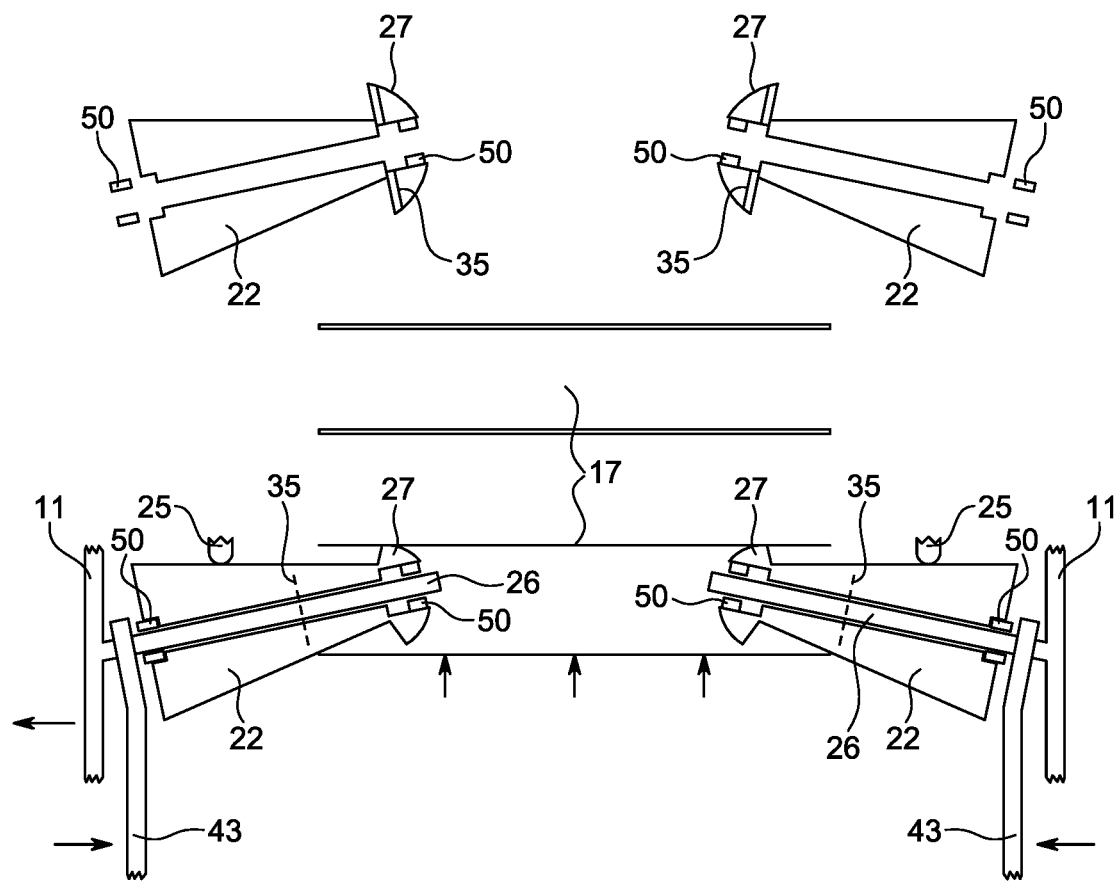
FIG. 15 illustrate two planetary cone-hemisphere arrangements, according to a second embodiment of the present disclosure.

FIG. 11A-D illustrate a schematic which is identical with FIG. 1 except the curved end of the hemisphere faces inwards to take account of the different contact circles. In some embodiments, the planetary carrier may be divided in half. Optionally, a pressure plate 43, or pressure plates 43 as shown in FIGS. 11D and 11C respectively, can be inserted between each half planet carrier and the bearings 50 at the base of the cones 22 as shown in FIG. 15. The circumference of the plates can have open ended slots so that the planet shafts 26 can slide in them. The curved portion of the hemisphere may face inwards towards the centre of the torque tube, and there are no internal blocking rings. The pressure plates force the cones inwards into the torque tubes providing great frictional adhesion between the hemispheres and the torque tubes internally and the cones and torque tubes externally. The dimensions may be chosen so that their circles of contact are the same diameter. The cones will only move out radially if they are held longitudinally stationary and the planet carrier halves diverge from each other. Here, the right half planet carrier is held longitudinally stationary by being mounted on a bearing in the right casing and the left half planet carrier pulled left by magnetic forces. The cones are fixedly located in the torque tubes by the pressure plates.

Figure 12:
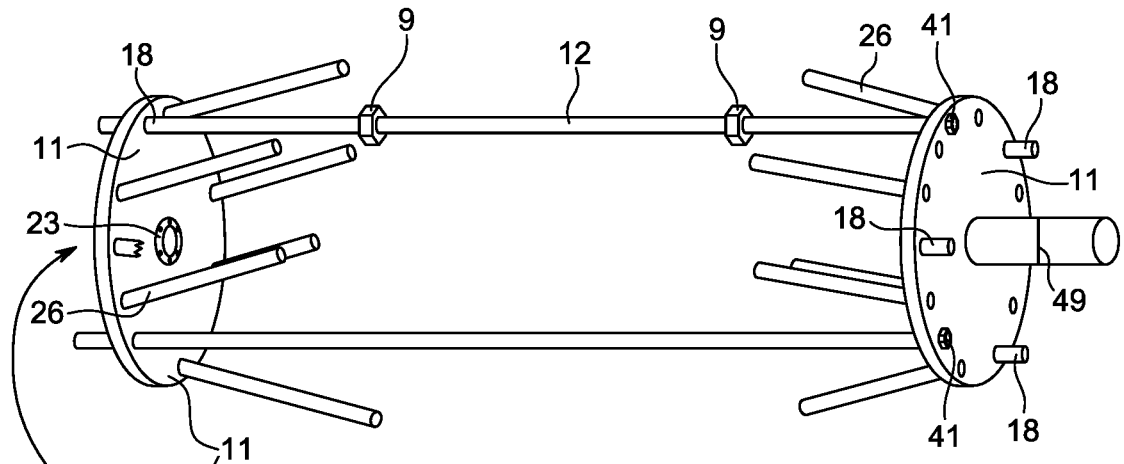
FIGS. 12 and 12A illustrate two different types of planetary carrier, according to a second embodiment of the present disclosure.
Figure 12A:
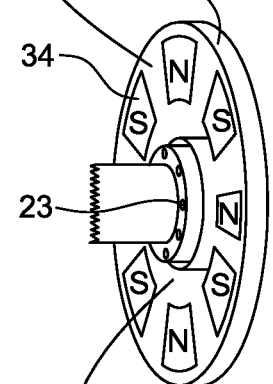
Figure 12A:
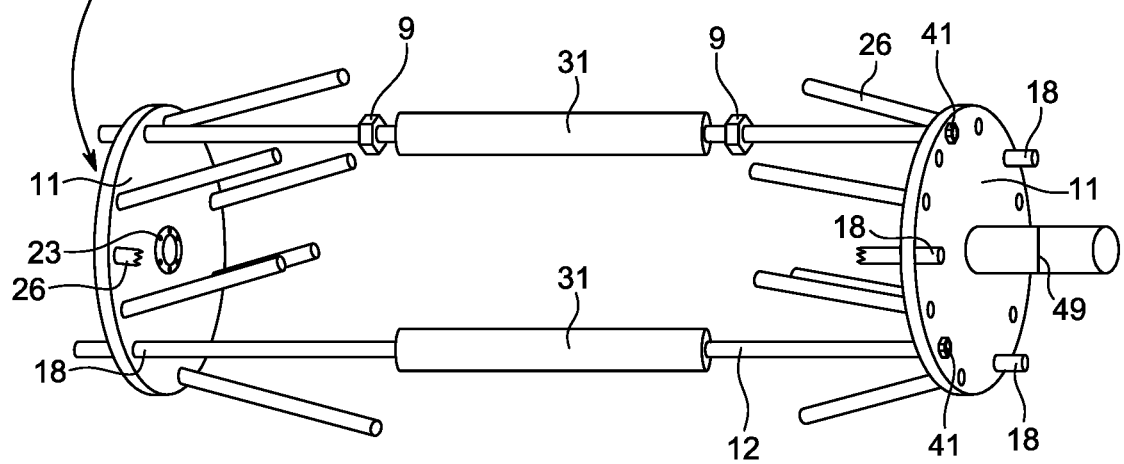

FIG. 12 provides a view of 6 planet shafts on each half planet carrier 11, and it is of the expandable type. It differs from the foregoing embodiments in that the right half carrier has a tubular extension by which it is mounted on the right half casing by a ball thrust bearing 10 visible in FIG. 19. The left half planet carrier 11 now has the magnets of an axial flux motor to it. The other change is that the rods connecting the halves serve as mounts for the tubular idler planets as shown in FIG. 12A, see also FIG. 18.

The system may additionally comprise a plurality of idler planets. In the exemplary embodiment, the idler planets are equal in number to the number of torque tubes. By way of example only, six torque tubes and six idler planets may be provided. These idler planets are tubular and the only difference between them and the torque tubes is that they are half the diameter or less. The idler planets are conveniently mounted on the rods 12 connecting the planet carrier halves together. They are therefore at a fixed radial distance from the central axis. They contribute to the spacing of the torque tubes and they facilitate getting a geared zero ratio.

Figure 13:
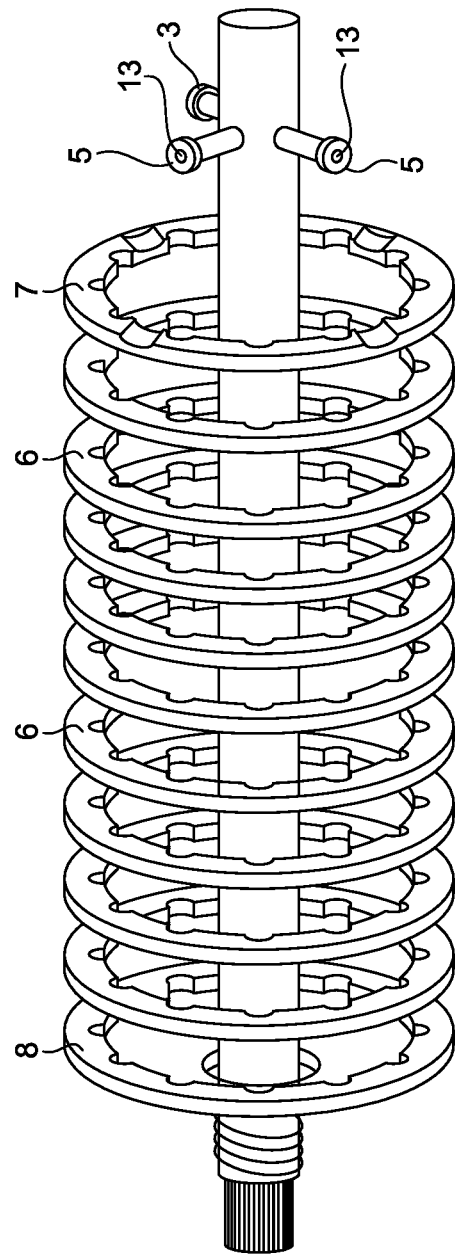
FIGS. 13 and 14 illustrate a second embodiment of a structure in which a series of vee-rings and intermediate spherical gears are loaded about a main shaft of the mechanism of FIGS. 11A-D, according to an embodiment of the present disclosure.
Figure 14:
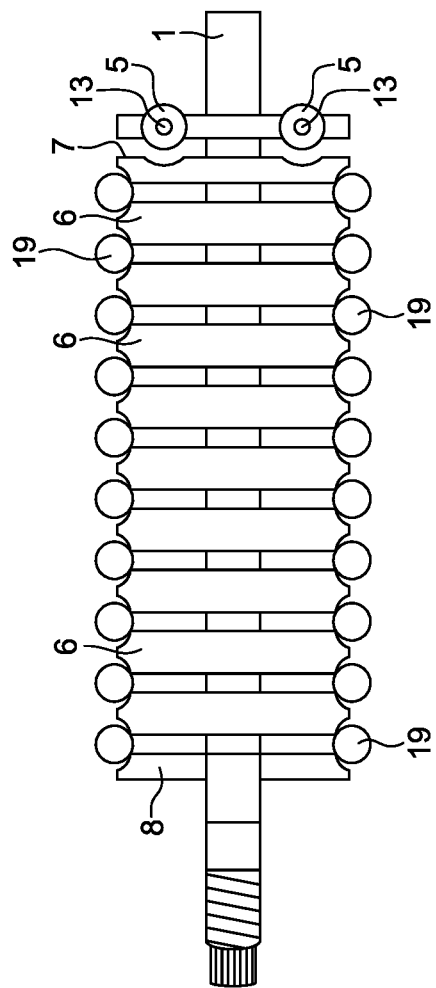

FIGS. 13 and 14 show the same aspects of the rings as FIGS. 3 and 4 except that the rotor in FIG. 4 is gone and in FIGS. 3 and 4 the two four-armed spiders are replaced by one 3-armed spider which is integral with the main shaft.

FIG. 15 shows the pressure plates 43. Unlike in FIGS. 5 and 5A, the hemispheres have the curves now facing inwards and there are no rings inside the torque tubes. In the exemplary embodiment, the imaginary contact circles 35 are of equal diameter.

Figure 16:
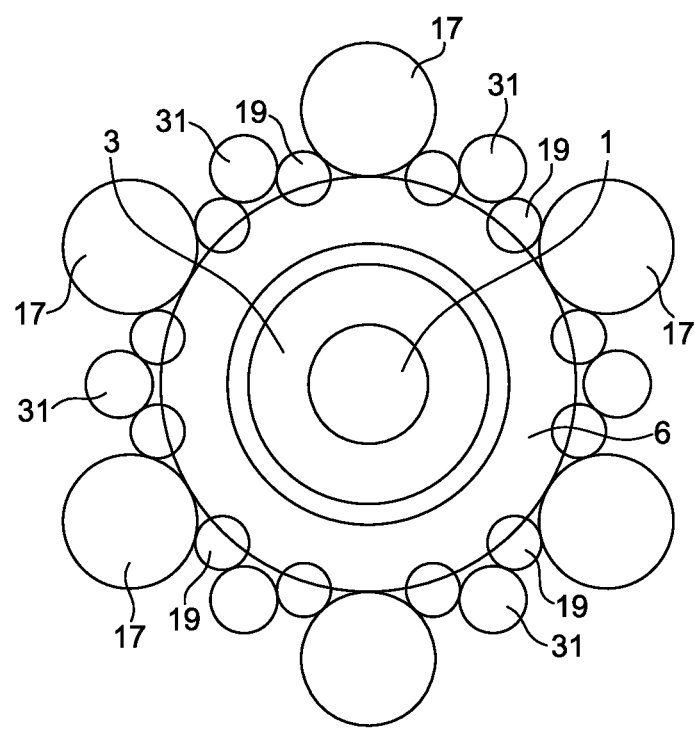
FIG. 16 illustrates an end view of the transmission mechanism, according to a second embodiment of the present disclosure.

FIG. 16 uses 6 torque tubes instead of the 8 in the embodiment of FIGS. 1-10. The only other difference between it and the embodiment of FIGS. 1-10 is that it has the idler planets between the ball gears.

Figure 17:
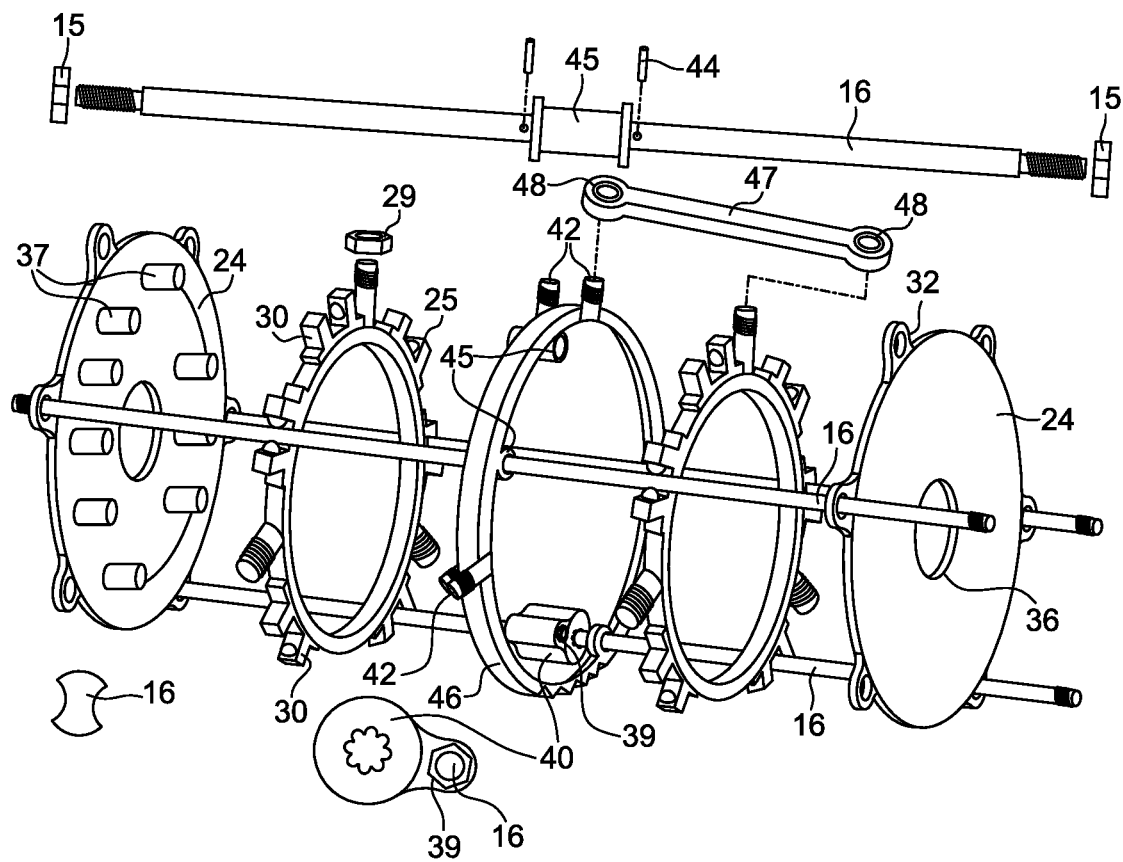
FIG. 17 is a perspective view of how all the outer components of the transmission system are configured and encased and two views of a reaction ring according to a second embodiment of the present disclosure.

FIG. 17 differs from FIG. 7 in that it shows the axial flux stator 37 which is attached to the left end plate. It also shows bearing 36 which was omitted in the right casing in the embodiment of FIGS. 1-10.

Figure 18:
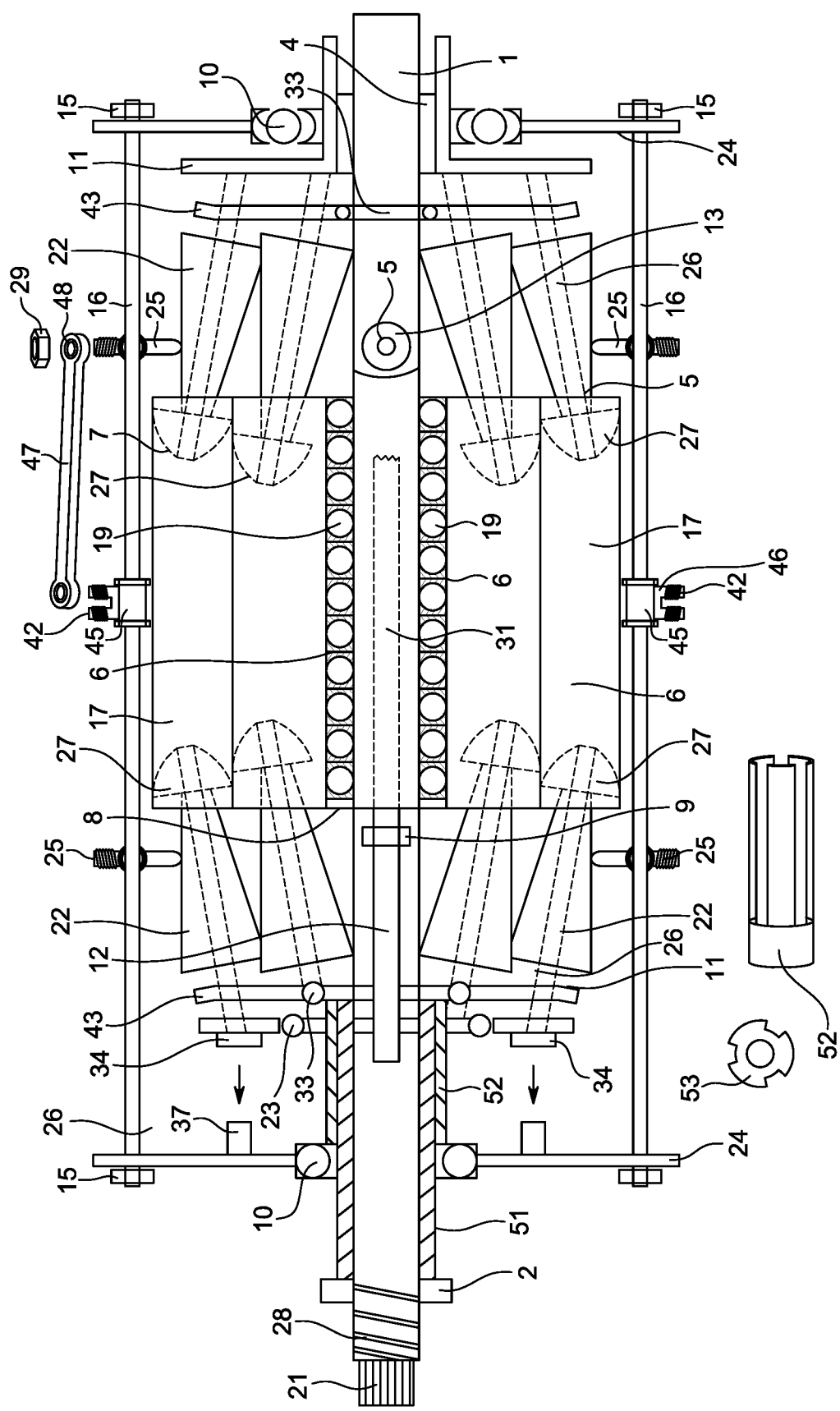
FIG. 18 and FIG. 19 illustrate multi-component views of an infinitely variable transmission system according to at least one embodiment of the present disclosure.

FIG. 18, similar to FIG. 9, shows as many components as possible without obscuring others. It shows all the aforementioned including the idler planets 31 and pressure plates 43. As can be seen in FIG. 18, the electric motor may be positioned at the extreme end of the unit. Advantageously, the motor may be an axial flux motor. The stator of the motor can be conveniently located in the casing of the transmission system avoiding the use of slip rings and the extra wiring involved in a centrally mounted motor. FIG. 18 also shows minor new components 51; 52; 53; 54.

The magnets of the rotor can be bonded to the planet carrier: in reality, the basic structure of the motor is already there. Having just one drum instead of two half drums greatly simplifies the structure and the motor itself will be more straightforward. However great these advantages are, it is the powerful attractive force between the rotor and the stator that is the key to unlocking the full potential of this type of transmission. This force can be exploited to a great extent using the design of the present disclosure.

Figure 19:
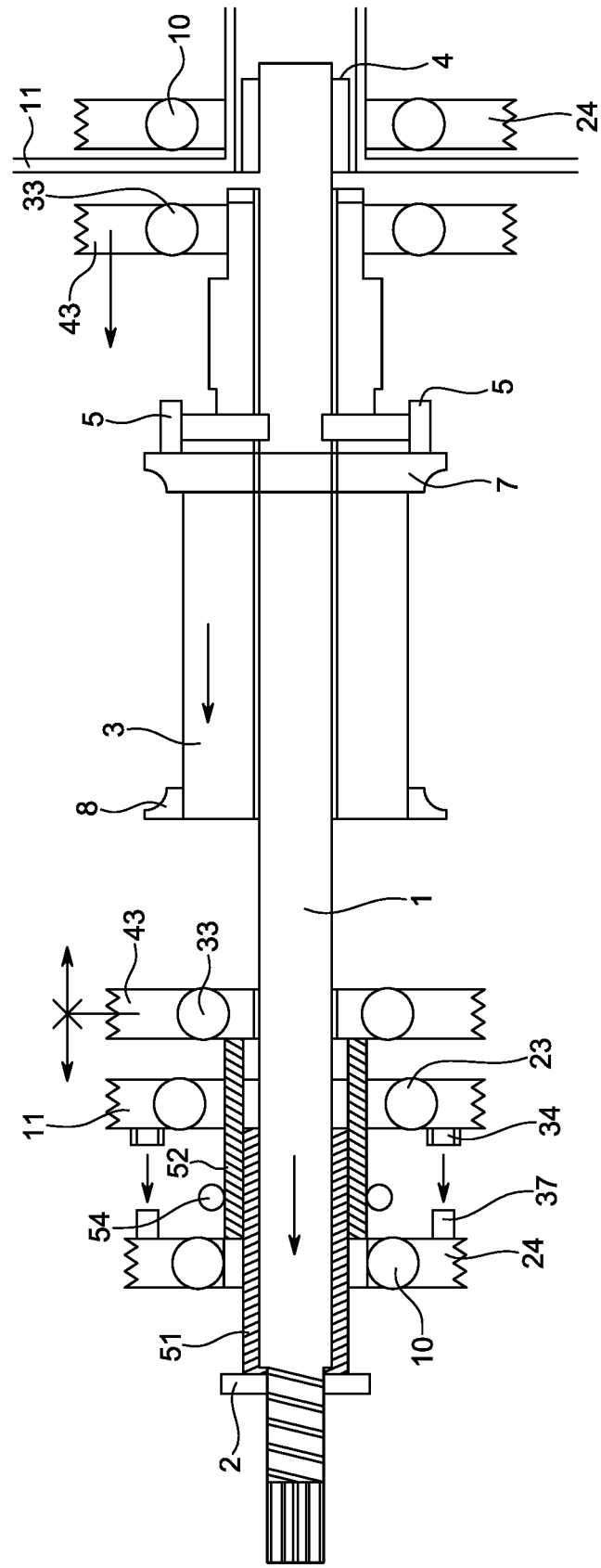

With specific reference to FIG. 19, the stator 37 located in the left casing 24 attracts the half planet carrier 11 leftwards, the inner race of its mounting bearing 23 bears against sleeve 51 pushing it leftwards against nut 2 which pulls the main shaft leftwards. Because the arms 13 of the spider are integral with the main shaft, they via rollers 5 compress the stack of vee-rings leftwards. The cylindrical drum 3 on which the vee rings are mounted also moves leftwards. This in turn causes pressure plate 43 to move left. FIG. 15 shows how this pressure plate 43 compresses the cones and torque tube up against the longitudinally stationary pressure plate 43 on the left. At the same time as these components are being compressed left, the ball gears are being forced out radially which in turn leads to the cones being forced out against the reaction rings.

In order for power to be transmitted by friction, there must be adhesion between: —
1. The reaction ring and the cones
2. The cone hemisphere and the torque tube
3. The torque tube and the ball gears
4. The ball gears and the vee rings The inventor claims that by means of the mechanisms outlined above, the force between the stator and rotor will enforce adhesion between all four of the above interfaces.

This adhesion will be augmented by the load pressurising mechanism.

FIGS. 20A to 29 show an alternative embodiment in which there are no idler planets, and the two pressuriser rings 4 are replaced by a single pressuriser plate 43 which is different in form and function to that illustrated in the previous Figures. Nuts 14 in FIG. 11A and components 51; 52; 53; 54 in FIG. 18 are also removed.

Figure 20A:
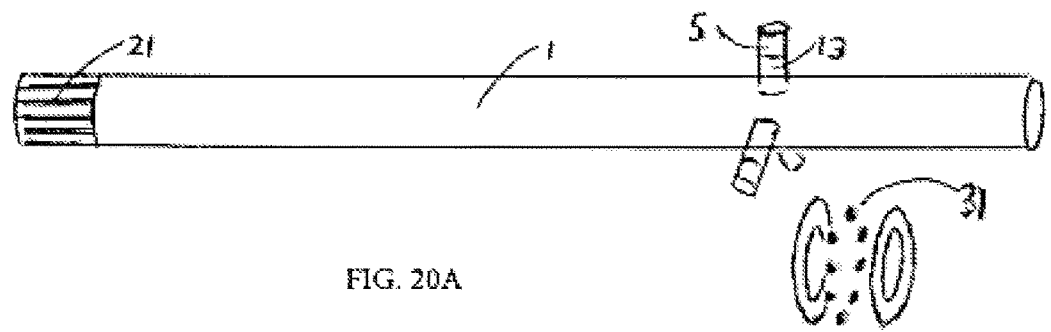

FIG. 20A shows the main shaft 1 and the thrust bearing 31 which is between the spider arms 13 and the rotor tube 21.

Figure 20B:
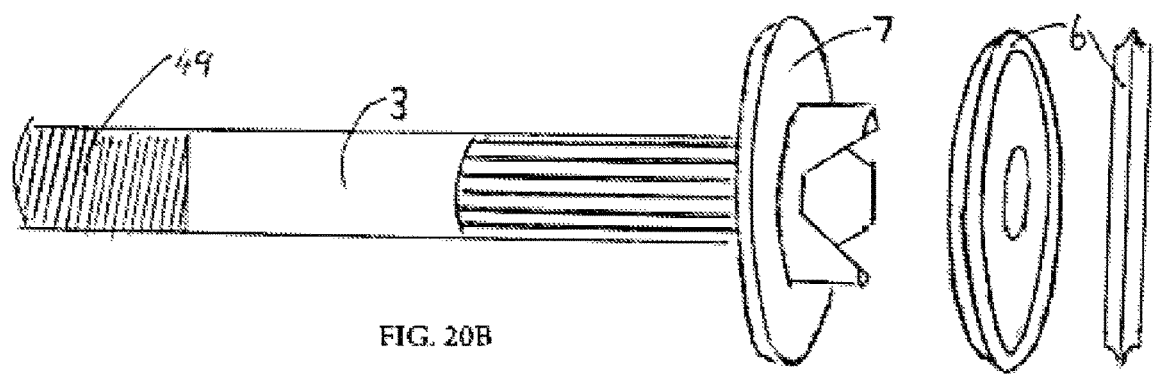
FIG. 20B shows the splined tube to mount ball race discs.

FIG. 20B shows the splined tube to mount ball race discs. It consists of three components welded together, a tube 3, the end ball race disc 7, and the cam inclines 49 previously called drum. The splined tube may preferably have a uniform diameter in some embodiments, and in alternative embodiments a variable diameter as desired.

Figure 20C:
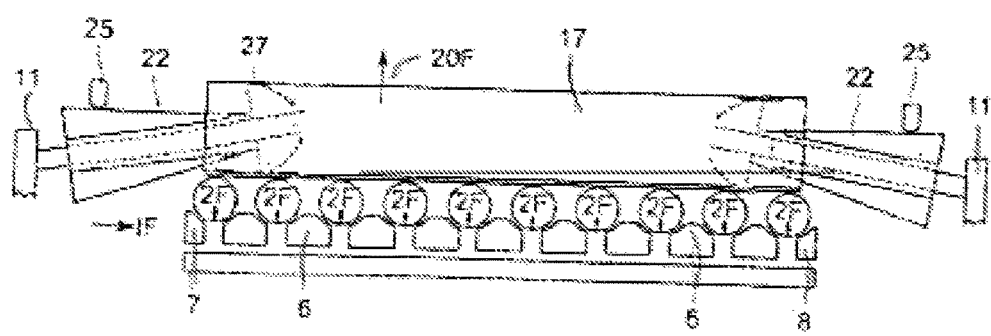
FIG. 20C is the same as FIG. 11C but without the two pressurizer plates.

FIG. 20C is the same as FIG. 11C but without the two pressurizer plates 43.

Figure 20D:
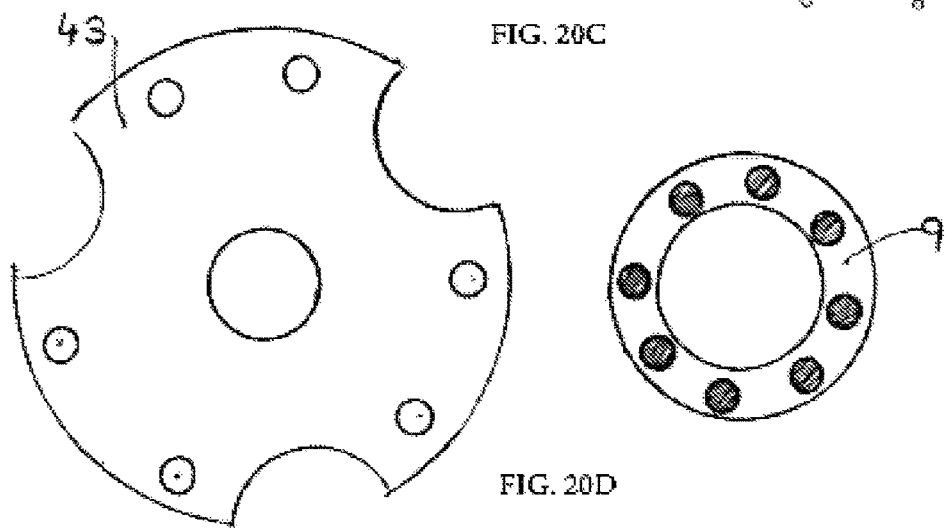
FIG. 20D shows the new pressurizer plate which replaces the two pressurizer rings, and which comprises three cutaways to accommodate the narrow ends of the cones.

FIG. 20D shows the new pressurizer plate 43 which replaces the two pressurizer rings 4, and which comprises three cutaways to accommodate the narrow ends of the cones. FIG. 20D also shows thrust bearing 9 which is between the new pressurizer plate 43 and the end ball race disc 8.

Figure 21:
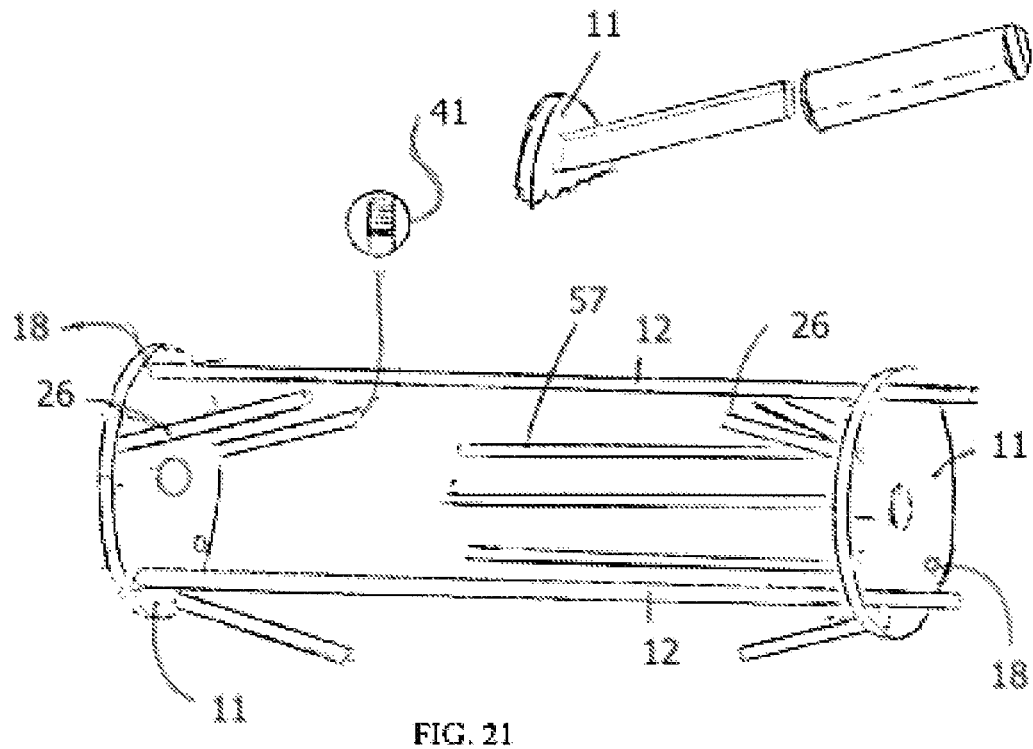

FIG. 21 shows how two half planet carriers are combined together in a different way to the preceding embodiments. Each half can have several projecting planet shafts to hold the cone/hemispheres. The drawing in FIG. 21 shows just three as this is judged to be the optimum number, although other numbers may be feasible in various embodiments. The left half has three long fixedly attached rods which slide through corresponding holes in the other half to be bolted to the rotor of the electric motor. In certain embodiments of the present disclosure ach of the planet shafts comprises an inner element and outer element. The inner element may comprise a section, such as rectangular section 11 visible in FIG. 21, bonded to its respective planetary carrier. The outer element may comprise a tube with an inner rectangular section such that it slides freely on the inner element. Preferably, the outer element is also configured to be capable of sliding slightly outwards radially.

Figure 22:
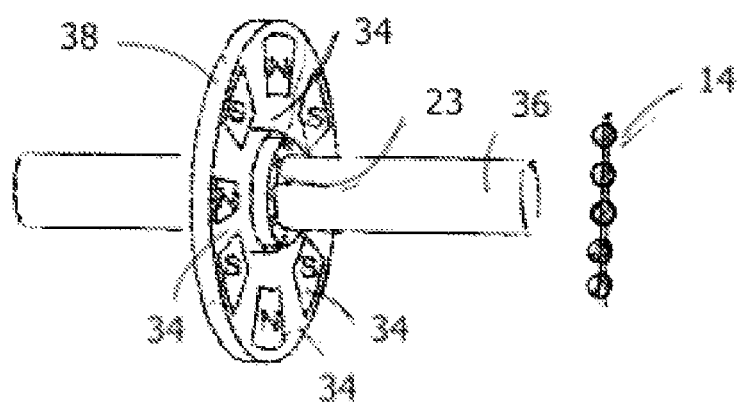

FIG. 22 shows the rotor of the axial flux motor. It consists of a disc mounted on a tube. Magnets 34 are bonded to one side of the disc. Such motors normally have a thrust bearing to prevent the rotor hitting the stator with catastrophic results. This unit has one for the same reasons but it is not used to counter the great force between the rotor and the stator. That force is used to pressurise the components and although the bearing is not necessary it is retained case of failure in adjustment, etc.

Figure 23:
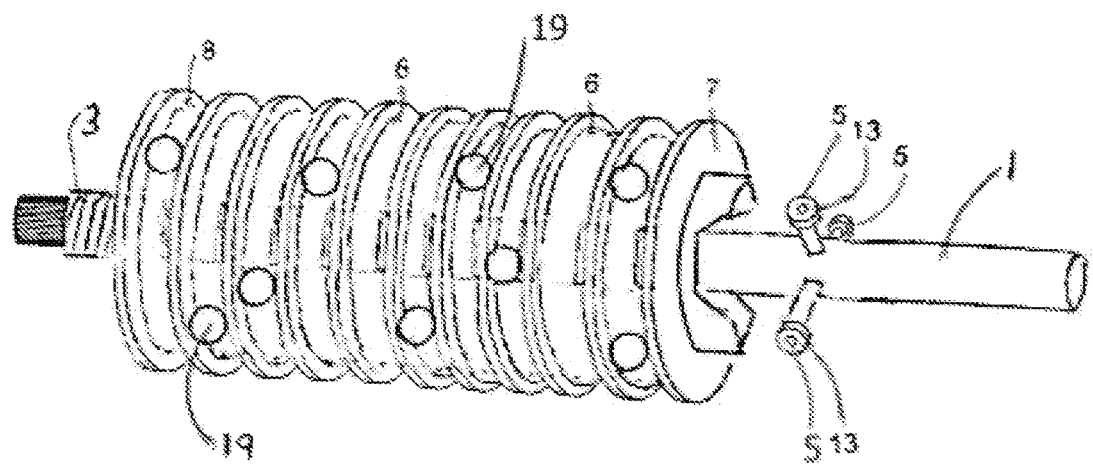

FIG. 23 is a perspective of ten ball race discs located around the main shaft and splined tube. It also shows some of the ball gears 19 in position.

Figure 24:
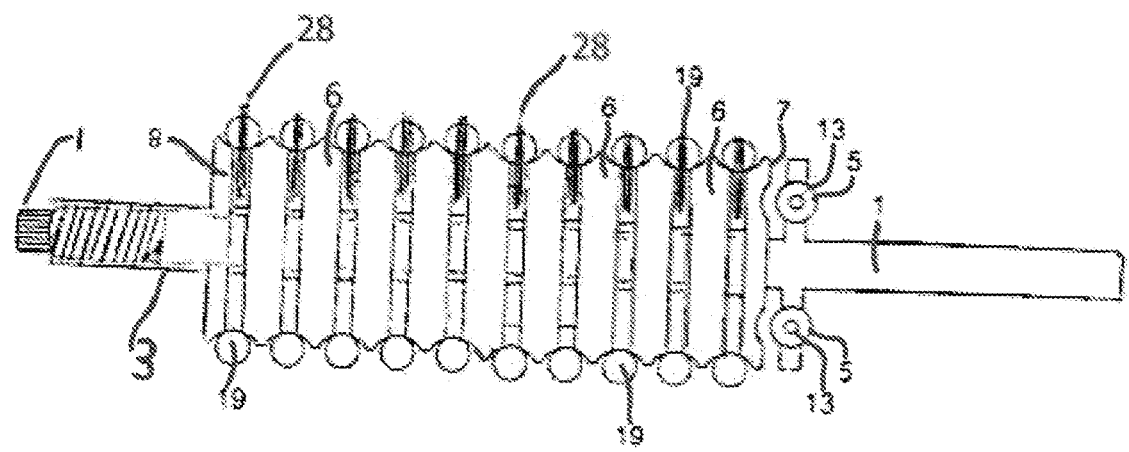

FIG. 24 shows a drawing with the same ten ball race discs and their associated ball gears 19. For the first time it shows the newly introduced ball gear retaining rings 28.

Figure 25:
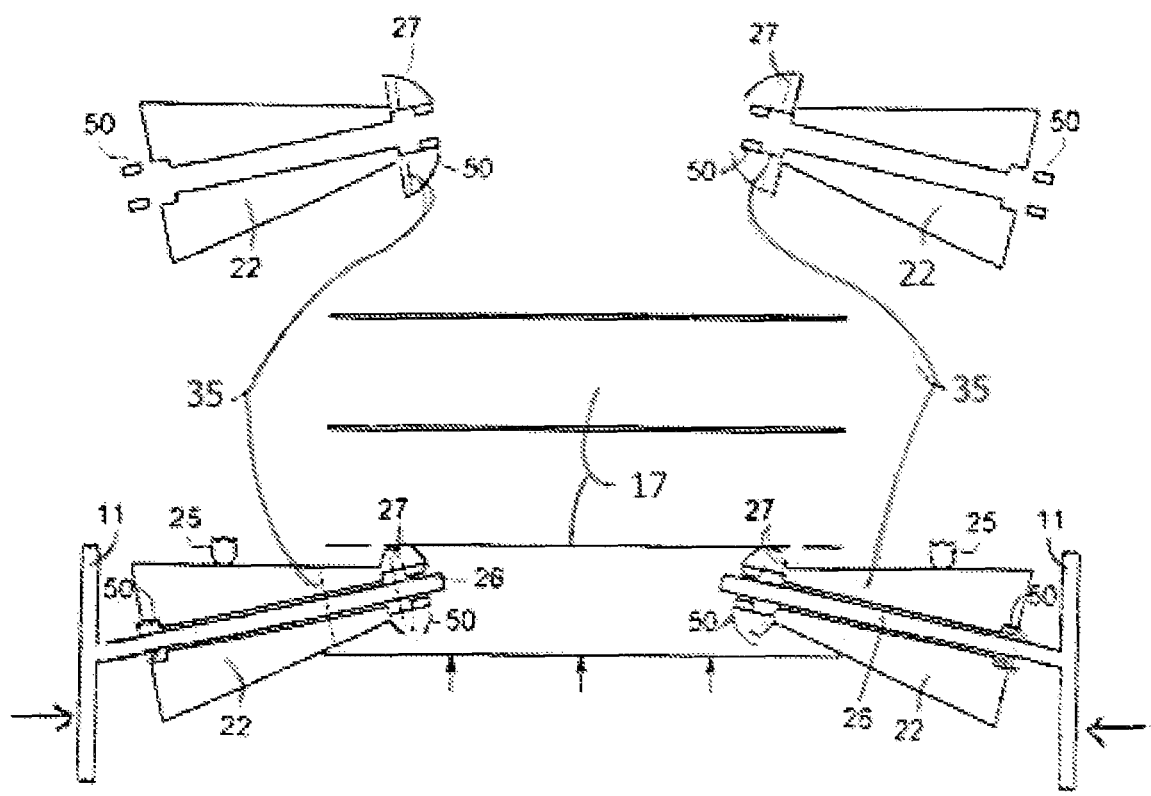

FIG. 25 is the same as FIG. 15 but without the two pressurizing rings 43.

Figure 26:
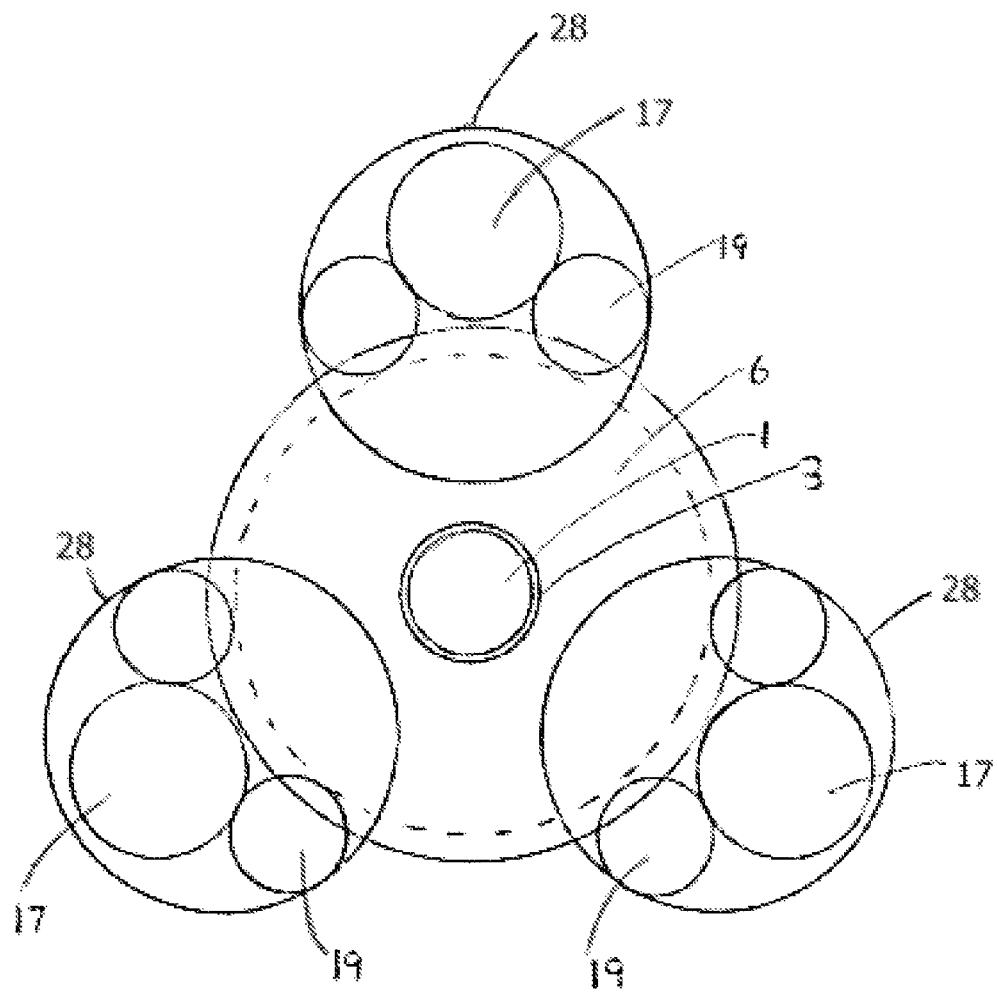

FIG. 26 shows a cross section of the transmission according to the embodiment of FIGS. 20A-29. The idler planets are removed, enabling each planetary ring assembly to be independent of its neighbour. This is by merit of the newly introduced ball gear retaining rings 28. An important point to note in FIG. 26 is that the torque tube can be close to the ball race disc and the ball gear retaining ring, but they must not touch. The ball gear retaining rings 28 perform the same function as the idler planets which they replace. They stop the ball gears 19 from flying radially outwards but they have two advantages over the idler planets. In one regard, they allow the full radial force outwards to be applied to the reaction rings whereas the idler planets absorb a considerable amount. In another regard, each planetary cone assembly is independent of its neighbour so that as few as three assemblies can be used which has its own advantages. Under outward radial pressure, the ball gears automatically space themselves diametrically opposite to each other in their respective retaining rings thereby dispensing with bearing cages. For this to happen the components involved, namely the torque tube, ball gear and ball race disc are preferably dimensioned such that the torque tubes do not touch the rings 28 nor the ball race disc 6.

Figure 27:
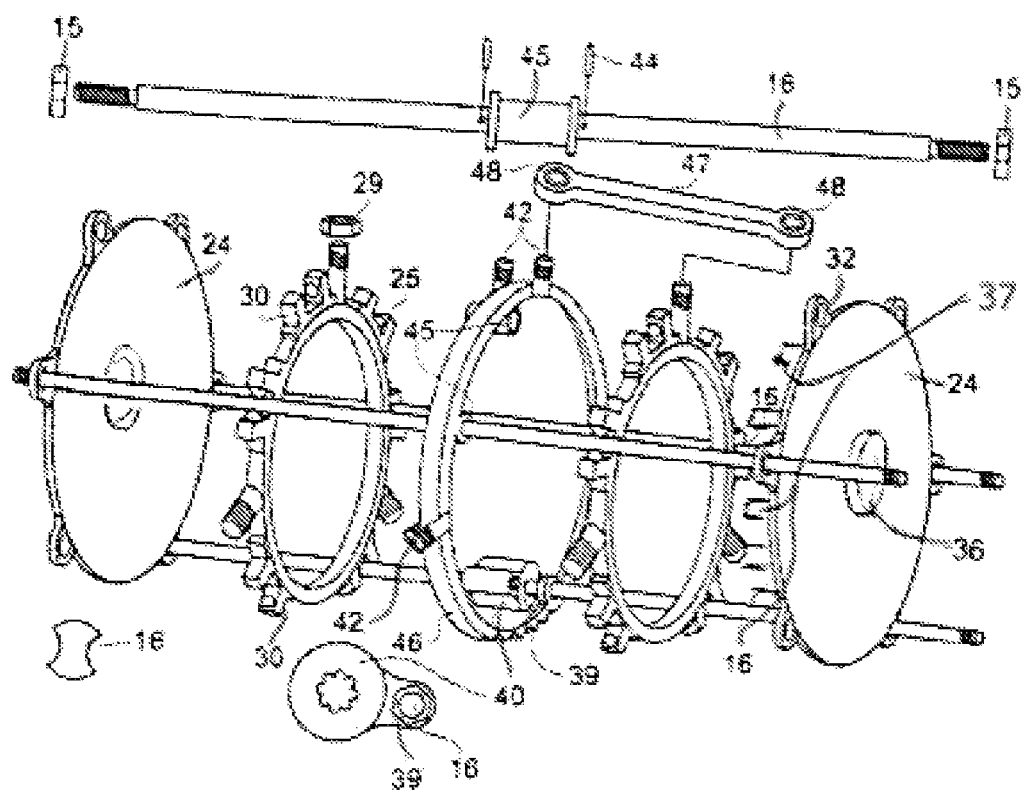

FIG. 27 is the same as FIG. 17 except that the stator of the electric motor is in the right casing.

Figure 28:
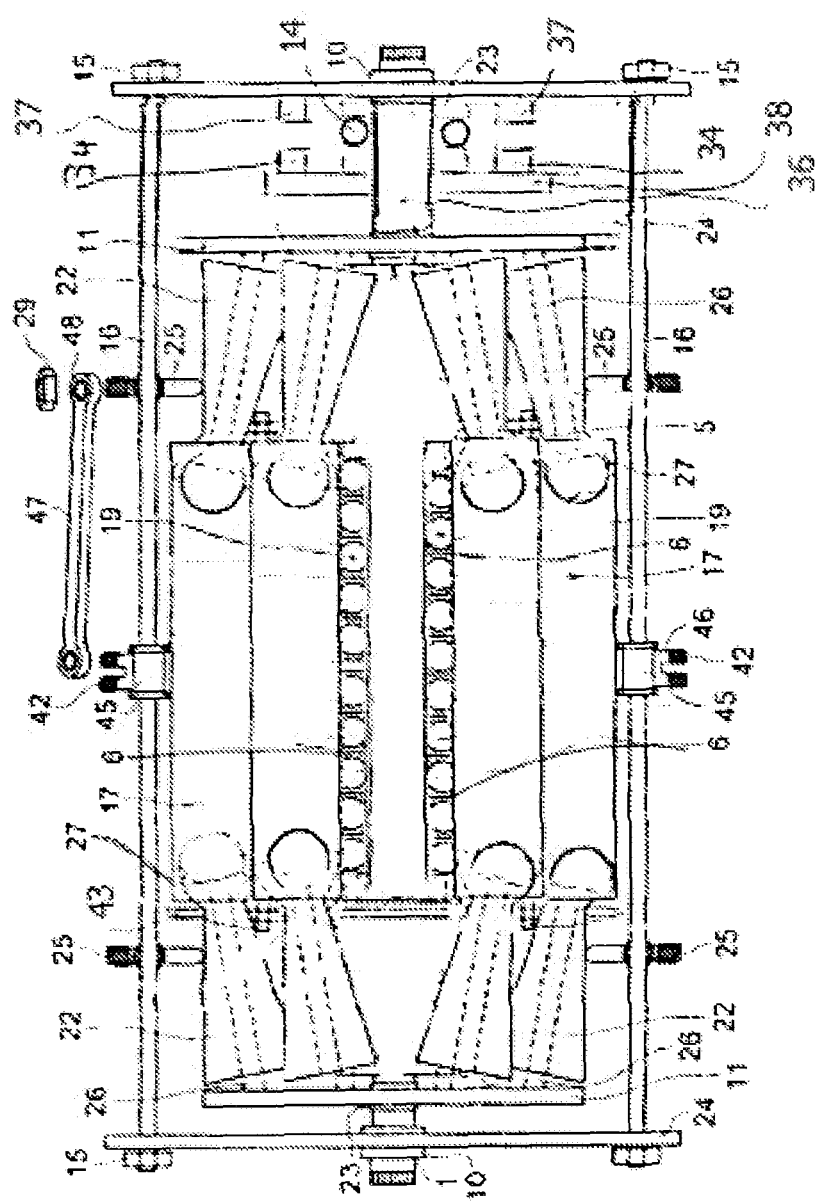

FIG. 28 shows the motor stator in the right casing and the default 14. Preferably, the electric motor is positioned on the same side as the load thrust mechanism, namely the spider arms 13. When the motor is on the same side as the mechanism generating the load force, the spider on the main shaft 1 rolling on the cam inclines of FIG. 20B, their two forces augment each other.

Figure 29:
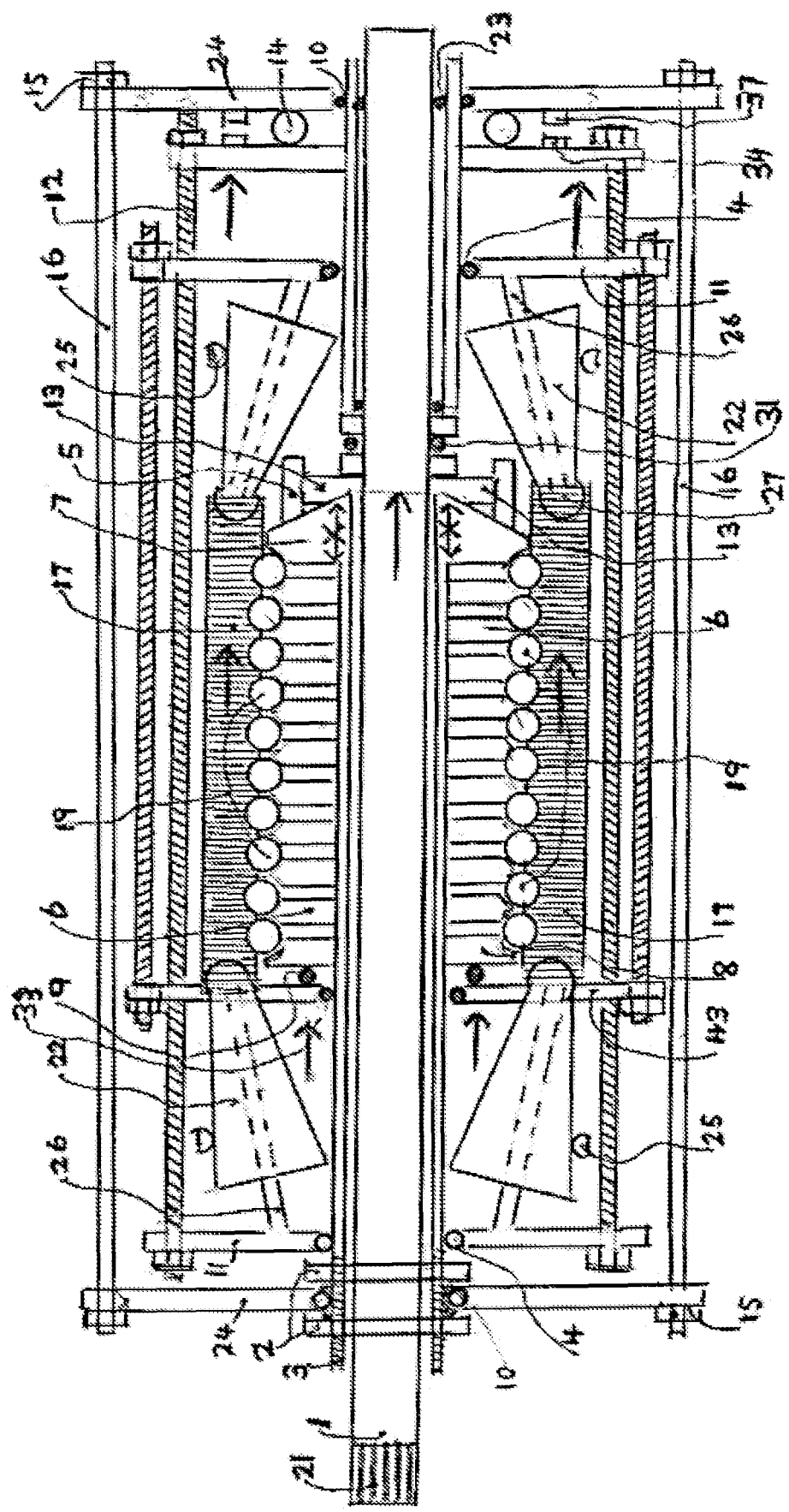

FIG. 29 shows as many components as possible without obscuring others. It shows the direction of the compressing forces. It shows the default bearing 14 (as does FIG. 28) in the default position. In normal operation, the stator which is located in the right casing is screwed with nuts 15 further away from the rotor taking the pressure off the default bearing and putting it on the components. The usual distance is just a few millimetres.

The words comprises/comprising when used in this specification are to specify the presence of stated features, integers, steps or components but does not preclude the presence or addition of one or more other features, integers, steps, components or groups thereof.

The invention claimed is:
1. An infinitely variable multi-epicyclic friction transmission system for an electric motor comprising:
  a casing for the infinitely variable multi-epicyclic friction transmission system;
  a main shaft and a plurality of ball race discs located around the main shaft;
  a splined tube comprising a tube, an end ball race disc of the plurality of ball race discs, and a plurality of cam inclines,
    wherein the splined tube is configured to bear the plurality of ball race discs, and splined on an outer circumferential surface so that the plurality of ball race discs can slide longitudinally along the splined tube;
  an axial flux motor comprising a stator which is fixedly located in a side plate of the casing for the infinitely variable multi-epicyclic friction transmission system;
  a default thrust bearing mounted on the main shaft between a rotor and the stator to prevent physical contact therebetween;

a plurality of twin planetary cone assemblies attached to at least one planetary carrier and disposed circumferentially around the splined tube, wherein each twin planetary cone assembly comprises a torque tube and a planetary cone-hemisphere structure provided at each end of the torque tube, wherein each planetary cone-hemisphere structure comprises a planetary cone integral with a hemisphere at its apex such that the plurality of twin planetary cone assemblies comprise hemispheres and torque tubes,
- wherein each planetary cone-hemisphere structure is configured to roll inside a respective torque tube via a respective hemisphere, and wherein a slant height of each planetary cone is parallel to the main shaft;

a series of spherical planets configured to alternate with the plurality of ball race discs;

a pressurizer plate comprising three cutaway portions suitable to accommodate narrow ends of each of the plurality of twin planetary cone assemblies;

at least one reaction ring disposed around each of the plurality of twin planetary cone assemblies and configured to slide along the planetary cone of each twin planetary cone assembly of the plurality of twin planetary cone assemblies to vary a gear ratio; and a plurality of ball gear retaining rings, wherein each of the plurality of ball gear retaining rings is mounted on one of a plurality of ball gears which are mounted on the plurality of ball race discs.

2. The infinitely variable multi-epicyclic friction transmission system of claim 1, wherein the planetary cone and the torque tube are dimensioned such that their circles of contact are a same diameter on the torque tube and the hemispheres.

3. The infinitely variable multi-epicyclic friction transmission system of claim 1, wherein the electric motor is located at an extreme end of the infinitely variable multi-epicyclic friction transmission system.

4. The infinitely variable multi-epicyclic friction transmission system of claim 1, wherein the electric motor is positioned on a same end of the infinitely variable multi-epicyclic friction transmission system as a load thrust mechanism.

5. The infinitely variable multi-epicyclic friction transmission system of claim 1, wherein the plurality of cam inclines on one side of the plurality of ball race discs are configured to be engaged with a load thrust mechanism on the main shaft, wherein the load thrust mechanism comprises a three-armed spider.

6. The infinitely variable multi-epicyclic friction transmission system of claim 1, wherein the plurality of ball gears associated with the plurality of ball race discs are further operable to function as ball bearings in the infinitely variable multi-epicyclic friction transmission system.

7. The infinitely variable multi-epicyclic friction transmission system of claim 1, wherein the plurality of ball race discs are configured to be compressed together from a distal end of the splined tube towards a motor end of the splined tube thus forcing the spherical planets radially outwards.

8. The infinitely variable multi-epicyclic friction transmission system of claim 1, wherein the rotor comprises a disc with magnets, in a halbach array or otherwise, bonded onto the outer circumferential surface facing the stator and mounted on the main shaft.

9. The infinitely variable multi-epicyclic friction transmission system of claim 1, wherein each planetary cone assembly is configured to move out radially away from the main shaft.

10. The infinitely variable multi-epicyclic friction transmission system of claim 1, wherein the plurality of twin planetary cone assemblies are mounted in the at least one planetary carrier.

11. The infinitely variable multi-epicyclic friction transmission system of claim 1, wherein the at least one planetary carrier comprises two planetary carriers coupled to each other and mounted on the main shaft.

12. The infinitely variable multi-epicyclic friction transmission system of claim 1, comprising between three and six twin planetary cone assemblies.

\* \* \* \* \*